United States Patent
Arimura et al.

(10) Patent No.: US 7,305,111 B2
(45) Date of Patent: Dec. 4, 2007

(54) AUTOMATED METHOD AND SYSTEM FOR THE DETECTION OF LUNG NODULES IN LOW-DOSE CT IMAGES FOR LUNG-CANCER SCREENING

(75) Inventors: Hidetaka Arimura, Clarendon Hills, IL (US); Feng Li, Clarendon Hills, IL (US); Junji Shiraishi, Westmont, IL (US); Kunio Doi, Willowbrook, IL (US)

(73) Assignee: University of Chicago, Chicago, IL (US)

( * ) Notice: Subject to any disclaimer, the term of this patent is extended or adjusted under 35 U.S.C. 154(b) by 679 days.

(21) Appl. No.: 10/767,342

(22) Filed: Jan. 30, 2004

(65) Prior Publication Data

US 2005/0171409 A1   Aug. 4, 2005

(51) Int. Cl.
G21K 1/12 (2006.01)
G06K 9/00 (2006.01)

(52) U.S. Cl. .................................... 382/131
(58) Field of Classification Search ............... 382/131, 382/128
See application file for complete search history.

(56) References Cited

U.S. PATENT DOCUMENTS

| | | | |
|---|---|---|---|
| 6,141,437 A * | 10/2000 | Xu et al. ................. | 382/130 |
| 6,754,380 B1 * | 6/2004 | Suzuki et al. .............. | 382/156 |
| 2002/0141627 A1 * | 10/2002 | Romsdahl et al. .......... | 382/131 |
| 2002/0172403 A1 * | 11/2002 | Doi et al. .................. | 382/128 |
| 2003/0028401 A1 * | 2/2003 | Kaufman et al. ........... | 705/3 |
| 2003/0095696 A1 * | 5/2003 | Reeves et al. ............. | 382/131 |
| 2004/0101181 A1 * | 5/2004 | Giger et al. ............... | 382/128 |

OTHER PUBLICATIONS

Masahiro Kaneko, et al., "Peripheral Lung Cancer: Screening and Detection with Low-Dose Spiral CT Versus Radiography," Radiology 201, 798-802 (1996).
Shusuke Sone, et al., "Mass Screening for Lung Cancer with Mobile Spiral Computed Tomography Scanner," Lancet 351, 1242-1245 (1998).
Stefan Diederich, et al., "Pulmonary Nodules: Experimental and Clinical Studies at Low-Dose CT," Radiology 213, 289-298 (1999).
Claudia I. Henschke, et al., "Early Lung Cancer Action Project: Overall Design and Findings form Baseline Screening," Lancet 354, 99-105 (1999).

(Continued)

*Primary Examiner*—Jingge Wu
*Assistant Examiner*—Amara Abdi
(74) *Attorney, Agent, or Firm*—Oblon, Spivak, McClelland, Maier & Neustadt, P.C.

(57) ABSTRACT

A method, system, and computer program product for detecting at least one nodule in a medical image of a subject, including identifying, in the medical image, an anatomical region corresponding to at least a portion of an organ of interest; filtering the medical image to obtain a difference image; detecting, in the difference image, a first plurality of nodule candidates within the anatomical region; calculating respective nodule feature values of the first plurality of nodule candidates based on pixel values of at least one of the medical image and the difference image; removing false positive nodule candidates from the first plurality of nodule candidates based on the respective nodule feature values to obtain a second plurality of nodule candidates; and determining the at least one nodule by classifying each of the second plurality of nodule candidates as a nodule or a non-nodule based on at least one of the pixel values and the respective nodule feature values. True-positive nodules are identified using linear discriminant analysis and/or a Multi-MTANN.

16 Claims, 26 Drawing Sheets

OTHER PUBLICATIONS

Takeshi Nawa, et al., "Lung Cancer Screening Using Low-Dose Spiral CT: Results of Baseline and 1 Year Follow-up Studies," Chest 122, 15-20 (2002).

Shinji Yamamoto, et al., "Image Processing for Computer-Aided Diagnosis of Lung Cancer by CT (LSCT)," Systems and Computers in Japan 25, 67-79 (1994).

Y. Ukai, et al., "Computer Aided Diagnosis System for Lung Cancer Based on Retrospective Helical CT Image," Proc. SPIE 3979, 1028-1039 (2000).

Samuel G. Armato III., et al., "Computerized Detection of Pulmonary Nodules on CT Scans," RadioGraphics 19, 1303-1311 (1999).

Samuel G. Armato III., et al., "Automated Detection of Lung Nodules in CT Scans: Preliminary Results," Med. Phys. 28, 1552-1561 (2001).

Samuel G. Armoto III., et al., "Lung Cancer: Performance of Automated Lung Nodule Detection Applied to Cancers Missed in a CT Screening Program," Radiology 225, 685-692 (2002).

Dag Wormanns, et al., "Automatic Detection of Pulmonary Nodules at Spiral CT: Clinical Application of a Computer-Aided Diagnosis System," Eur. Radiol. 12, 1052-1057 (2002).

Metin N. Gurcan, et al., "Lung Nodule Detection on Thoracic Computed Tomography Images: Preliminary Evaluation of a Computer-Aided Diagnosis System," Med. Phys. 29, 2552-2558 (2002).

Matthew S. Brown., et al., "Lung Micronodules: Automated Method for Detection at Thin-Section CT—Initial Experience," Radiology 226, 256-262 (2003).

Maryellen Lissak Giger, et al., "Image Feature Analysis and Computer-Aided Diagnosis in Digital Radiography: Automated Detection of Nodules in Peripheral Lung Fields," Med Phys. 15, 158-166 (1988).

Xin-Wei Xu, et al., "Development of an Improved CAD Scheme for Automated Detection of Lung Nodules in Digital Chest Images," Med. Phys. 24, 1395-1403 (1997).

Feng Li, et al., "Lung Cancers Missed at Low-Dose Helical CT Screening in a General Population: Comparison of Clinical, Histopathologic, and Imaging Findings," Radiology 225, 673-683 (2002).

Kenji Suzuki, et al., "Massive Training Artificial Neural Network (MTANN) for Reduction of False Positives in Computerized Detection of Lung Nodules in Low-Dose Computed Tomography," Med, Phys., 1602-1617 (2003).

Kenji Suzuki, et al., "Effect of a Small Number of Training Cases on the Performance of Massive Training Artificial Neural Network (MTANN) for Reduction of False Positives in Computerized Detection of Lung Nodules in Low-Dose CT," SPIE Proc. 5032, 1355-1366 (2003).

Masahito Aoyama, et al., "Automated Computerized Scheme for Distinction Between Benign and Malignant Solitary Pulmonary Nodules on Chest Images," Med Phys. 29, 701-708 (2002).

Berkman Sahiner, et al., "Computerized Characterization of Masses on Mammograms: The Rubber Band Straightening Transform and Texture Analysis," Med. Phys. 24, 516-526 (1998).

\* cited by examiner

AUTOMATED METHOD AND SYSTEM FOR THE DETECTION OF LUNG NODULES IN LOW-DOSE CT IMAGES FOR LUNG-CANCER SCREENING

STATEMENT REGARDING FEDERALLY SPONSORED RESEARCH

The present invention was made in part with U.S. Government support under NIH Grant Nos. CA062625 and CA064370. The U.S. Government may have certain rights to this invention.

BACKGROUND OF THE INVENTION

Field of the Invention

The invention relates generally to the computerized, automated assessment of computed tomography (CT) scans or images, and more particularly, to methods, systems, and computer program products for detecting lung nodules in low-dose helical CT scans of the thorax to assess lung cancer.

The present invention also generally relates to computerized techniques for the automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,138,045; 6,141,437; 6,185,320; 6,205,348; 6,240,201; 6,282,305; 6,282,307; 6,317,617; 6,335,980; 6,363,163; 6,442,287; 6,466,689; 6,470,092, as well as U.S. patent application Ser. Nos. 09/692,218; 09/759,333; 09/760,854; 09/773,636; 09/816,217; 09/830,562; 09/830,574; 10/120,420; 10/292,625; 10/301,836; 10/358,337; 10/360,814; and 10/366,482, all of which are incorporated herein by reference.

The present invention includes use of various technologies referenced and described in the above-noted U.S. patents and Applications, as well as described in the references identified in the following LIST OF REFERENCES by the author(s) and year of publication, and cross-referenced throughout the specification by reference to the respective number, in brackets, of the reference:

LIST OF REFERENCES

1. M. Kaneko, K. Eguchi, H. Ohmatsu, R. Kakinuma, T. Naruke, K. Suemasu, and N. Moriyama, "Peripheral lung cancer: screening and detection with low-dose spiral CT versus radiography," Radiology 201, 798-802 (1996).
2. S. Sone, S. Takashima, F. Li, Z. Yang, T. Honda, Y. Maruyama, M. Hasegawa, K. Kubo, K. Hanamura, and K. Asakura, "Mass screening for lung cancer with mobile spiral computed tomography scanner," Lancet 351, 1242-1245 (1998).
3. S. Diederich, H. Lenzen, R. Windmann, Z. Puskas, T. M. Yelbuz, S. Henneken, T. Klaiber, M. Eameri, N. Roos, and P. E. Peters, "Pulmonary nodules: experimental and clinical studies at low-dose CT," Radiology 213, 289-298 (1999).
4. C. I. Henschke, D. I. McCauley, D. F. Yankelevitz, D. P. Naidich, G. McGuinness, O. S. Miettinen, D. M. Libby, M. W. Pasmantier, J. Koizumi, N. K. Altorki, J. P. Smith, "Early lung cancer action project: overall design and findings from baseline screening," Lancet 354, 99-105 (1999).
5. T. Nawa, T. Nakagawa, S. Kusano, Y. Kawasaki, Y. Sugawara, and H. Nakata, "Lung cancer screening using low-dose spiral CT: Results of baseline and 1-year follow-up studies," Chest 122, 15-20 (2002).
6. S. Yamamoto, I. Tanaka, M. Senda, Y. Tateno, T. Iinuma, and T. Matsumoto, "Image processing for computer-aided diagnosis of lung cancer by CT (LSCT)," Systems and Computers in Japan 25, 67-79 (1994).
7. H. Jiang, S. Yamamoto, S. Iisaku, M. Matsumoto, Y. Tateno, T. Iinuma, and T. Matsumoto, "Computer-aided diagnosis system for lung cancer screening by CT," in Computer-Aided Diagnosis in Medical Imaging edited by K. Doi et al., pp. 125-130 (1999).
8. Y. Ukai, N. Niki, H. Satoh, K. Eguchi, K. Mori, H. Ohmatsu, R. Kakinuma, M. Kaneko, and N. Moriyama, "Computer aided diagnosis system for lung cancer based on retrospective helical CT image," Proc. SPIE 3979, 1028-1039 (2000).
9. S. G. Armato III, M. L. Giger, C. J. Moran, J. T. Blackburn, K. Doi, and H. MacMahon, "Computerized detection of pulmonary nodules on CT scans," RadioGraphics 19, 1303-1311 (1999).
10. S. G. Armato III, M. L. Giger, and H. MacMahon, "Automated detection of lung nodules in CT scans: Preliminary results," Med. Phys. 28, 1552-1561 (2001).
11. S. G. Armato III, F. Li, M. L. Giger, H. MacMahon, S. Sone, and K. Doi, "Lung cancer: Performance of automated lung nodule detection applied to cancers missed in a CT screening program," Radiology 225, 685-692 (2002).
12. D. Wormanns, M. Fiebich, M. Saidi, S. Diederich, and W. Heindel, "Automatic detection of pulmonary nodules at spiral CT: clinical application of a computer-aided diagnosis system," Eur. Radiol. 12, 1052-1057 (2002).
13. M. N. Gurcan, B. Sahiner, N. Petrick, H. P. Chan, E. A. Kazerooni, P. N. Cascade, and L. Hadjiiski, "Lung nodule detection on thoracic computed tomography images: Preliminary evaluation of a computer-aided diagnosis system," Med. Phys. 29, 2552-2558 (2002).
14. M. S. Brown, J. G. Goldin, R. D. Suh, M. F. McNitt-Gray, J. W. Sayre, and D. R. Aberle, "Lung micronodules: Automated method for detection at thin-section CT—Initial experience," Radiology 226, 256-262 (2003).
15. M. L. Giger, K. Doi, and H. MacMahon, "Image feature analysis and computer-aided diagnosis in digital radiography: automated detection of nodules in peripheral lung fields," Med. Phys. 15, 158-166 (1988).
16. M. L. Giger, K. Doi, H. MacMahon, C. E. Metz, and F. F. Yin, "Pulmonary nodules: Computer-aided detection in digital radiography," RadioGraphics 10, 41-51 (1990).
17. X. W. Xu, K. Doi, T. Kobayashi, H. MacMahon, and M. L. Giger, "Development of an improved CAD scheme for automated detection of lung nodules in digital chest images," Med. Phys. 24, 1395-1403 (1997).
18. S. Sone, S. Takashima, F. Li, Z. Yang, T. Honda, Y. Maruyama, M. Hasegawa, T. Yamada, K. Kudo, K. Hanamura, K. Asakura, "Mass screening for lung cancer with mobile spiral computed tomography scanner," Lancet 351, 1242-1245 (1998).
19. F. Li, S. Sone, H. Abe, H. MacMahon, S. G. Armato III, and K. Doi, "Lung cancers missed at low-dose helical CT screening in a general population: comparison of clinical, histopathologic, and imaging findings," Radiology 225, 673-683 (2002).

20. N. Otsu, "A threshold selection method from gray level histograms," IEEE Trans. Syst., Man. & Cybern., SMC-9, 62-66 (1979).
21. M. P. de Carmo, *Differential geometry of curves and surfaces*, Prentice Hall Inc., Englewood Cliffs, N.J. (1976).
22. K. Suzuki, S. G. Armato III, S. Sone, and K. Doi, "Massive training artificial neural network for reduction of false positives in computerized detection of lung nodules in low-dose CT," Med. Phys. 29, 1322 (2002) (abstract).
23. K. Suzuki, S. G. Armato III, F. Li, S. Sone, K. Doi, "Computer-aided diagnostic scheme for detection of lung nodules in CT by use of massive training artificial neural network," Radiology 225(P), 533 (2002) (abstract).
24. K. Suzuki, S. G. Armato III, F. Li, S. Sone, and K. Doi, "Massive training artificial neural network (MTANN) for reduction of false positives in computerized detection of lung nodules in low-dose CT," (2003) (submitted to Med. Phys.).
25. K. Suzuki, S. G. Armato III, F. Li, S. Sone, K. Doi, "Effect of a small number of training cases on the performance of massive training artificial neural network (MTANN) for reduction of false positives in computerized detection of lung nodules in low-dose CT," SPIE Proc. 5032 (2003) (in press).
26. M. Aoyama, Q. Li, S. Katsuragawa, H. MacMahon, and K. Doi, "Automated computerized scheme for distinction between benign and malignant solitary pulmonary nodules on chest images," Med. Phys. 29, 701-708 (2002).
27. R. A. Johnson and D. W. Wichern, *Applied Multivariate Statistical Analysis* (Prentice-Hall, Englewood Cliffs, N.J., 1992), Sec. 5.3, pp. 184-188.
28. B. Sahiner et al., "Computerized characterization of masses on mammograms: The rubber band straightening transform and texture analysis," Med. Phys. 24, 516-526 (1998).

DISCUSSION OF THE BACKGROUND

Low-dose helical computed tomography (LDCT) screening is regarded as one of the most promising techniques for the early detection of lung cancer [1-5]. Moreover, it has been reported that CT images are superior to chest radiographs for detecting peripheral lung cancers [1]. However, it is a difficult and time-consuming task for radiologists to detect subtle lung nodules in a large number of CT slices for lung cancer screening. Thus, computer-aided diagnostic (CAD) schemes using LDCT are needed to assist radiologists in screening for cancer.

A number of investigators [6-14] have attempted to develop CAD schemes for the computerized detection of lung nodules by using various methods and techniques. In an early attempt, Yamamoto et al. [6] developed a CAD system for lung cancer screening with LDCT based on a morphological filter ("Quoit filter"), and, using this technique, Jiang et al. [7] reported 100% sensitivity with 0.14 false positives per slice for 82 cases (2,160 slices), including 21 cancers. Ukai et al. [8] developed a prototype CAD system for the automated detection of suspicious regions from LDCT images by using a fuzzy clustering method and reported a sensitivity of 95%, although the number of false positives was not reported. Armato et al. [9-10] reported a computerized method for the detection of lung nodules in helical CT scans based on two-dimensional and three-dimensional analyses of the image data. In addition, Armato et al. [11] evaluated the performance of the CAD system for a database of low-dose CT scans with 38 cancers that may have been "missed" in a screening program; the CAD system correctly detected 84% of all cancers with 1.0 false positives per slice.

Wormanns et al. [12] reported the evaluation of a CAD workstation with an automatic detection algorithm of pulmonary nodules with low-dose helical CT in a clinical setting for early detection of lung cancer; the sensitivity for 88 CT examinations was 38% with about 5.8 false positives per scan. Recently, Gurcan et al. [13] reported a preliminary evaluation of a CAD system for lung nodule detection on helical CT images; the scheme was based on weighted k-means clustering segmentation, and the sensitivity was 84% with 1.74 false positives per slice. Brown et al. [14] developed an automated system for detecting lung micronodules on thin-section CT images based on three-dimensional segmentation by use of a model of lung nodules and intrathoracic anatomy, and reported a sensitivity of 100% for nodules (>3 mm in diameter) and 70% for micronodules (<=3 mm), with 15 false positives per scan. However, further efforts are required for the development of CAD systems for lung cancer screening by use of low-dose CT having a higher sensitivity and a lower number of false positives per scan.

SUMMARY OF THE INVENTION

Accordingly, an object of the present invention is to provide a method, system, and computer program product for the automated detection of nodules in a medical image of a subject.

A further object of the present invention is to provide a method, system, and computer program product for the automated detection of pulmonary nodules in LDCT scans for lung cancer screening.

These and other objects are achieved according to the present invention by providing a novel method, system, and computer program product for detecting at least one nodule in a medical image of a subject, comprising: (1) identifying, in the medical image, an anatomical region corresponding to at least a portion of an organ of interest; (2) filtering the medical image to obtain a difference image; (3) detecting, in the difference image, a first plurality of nodule candidates within the anatomical region; (4) calculating respective nodule feature values of the first plurality of nodule candidates based on image pixel values of at least one of the medical image and the difference image; (5) removing false positive nodule candidates from the first plurality of nodule candidates based on the respective nodule feature values to obtain a second plurality of nodule candidates; and (6) determining the at least one nodule by classifying each of the second plurality of nodule candidates as a nodule or a non-nodule based on at least one of the image pixel values and the respective nodule feature values.

According to another aspect of the present invention, the identifying step comprises: (1) forming a histogram of gray-values of pixels in the medical image; (2) determining a gray-level threshold using the histogram; and (3) identifying an outline of the anatomical region using the gray-level threshold.

According to still another aspect of the present invention, the filtering step comprises: (1) filtering the medical image using a matched filter to obtain a nodule-enhanced image; (2) filtering the medical image using a ring-average filter to obtain a nodule-suppressed image; and (3) subtracting the nodule-suppressed image from the nodule-enhanced image to obtain the difference image.

According to a further aspect of the present invention, the detecting step comprises: (1) forming initial regions within the anatomical region; (2) selecting the first plurality of nodule candidates based on the initial regions, each nodule candidate having a respective nodule region including one of the initial regions; and (3) adjusting the respective nodule regions of each nodule candidate using region growing.

According to a still further aspect of the present invention, the calculating step comprises: (1) determining, for each candidate nodule in the first plurality of candidate nodules, at least one respective morphological feature value, including at least one of effective diameter, circularity, and irregularity; and (2) determining, for each candidate nodule in the first plurality of candidate nodules, at least one respective gray level feature value, including at least one of a nodule contrast in the difference image, a nodule contrast in the medical image, a nodule contrast of a nodule outer region, and a standard deviation of the nodule outer region.

According to still another aspect of the present invention, the removing step comprises removing false positive nodule candidates from the first plurality of nodule candidates based on the at least one respective morphological feature value and the at least one respective gray level feature value.

According to still another aspect of the present invention, the calculating step comprises: (1) determining, for each candidate nodule in the first plurality of candidate nodules, at least one respective interior feature value, including one of an average pixel value, full width at half maximum (FWHM), and full width at tenth maximum (FWTM), based on pixel values in an interior region of each candidate nodule; and (2) determining, for each candidate nodule in the first plurality of candidate nodules, at least one respective exterior feature value, including one of an average pixel value, full width at half maximum (FWHM), and full width at tenth maximum (FWTM), based on pixel values in an exterior region of each candidate nodule.

According to still another aspect of the present invention, the removing step comprises removing false positive nodule candidates from the first plurality of nodule candidates based on the at least one respective interior feature value, the at least one respective exterior feature value, and respective locations of the nodule candidates within the anatomical region.

According to another aspect of the present invention, the determining step comprises determining at least one nodule from the second plurality of nodule candidates based on the image pixel values using a Multi-MTANN (Massive Training Artificial Neural Network).

According to another aspect of the present invention, the determining step comprises determining, based on the respective nodule feature values, the at least one nodule from the second plurality of nodule candidates using a linear discriminant analysis (LDA).

According to another aspect of the present invention, the determining step comprises: (1) training a plurality of MTANNs to distinguish nodules from a respective type of non-nodules; and (2) classifying, based on the image pixel values, the second plurality of nodule candidates using the plurality of trained MTANNs to obtain the at least one nodule.

Because the purpose of lung cancer screening is to find cancers as early as possible, the method according to the present invention was tested on a confirmed cancer database including "missed" cancer scans obtained from a lung cancer screening program.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 2A:
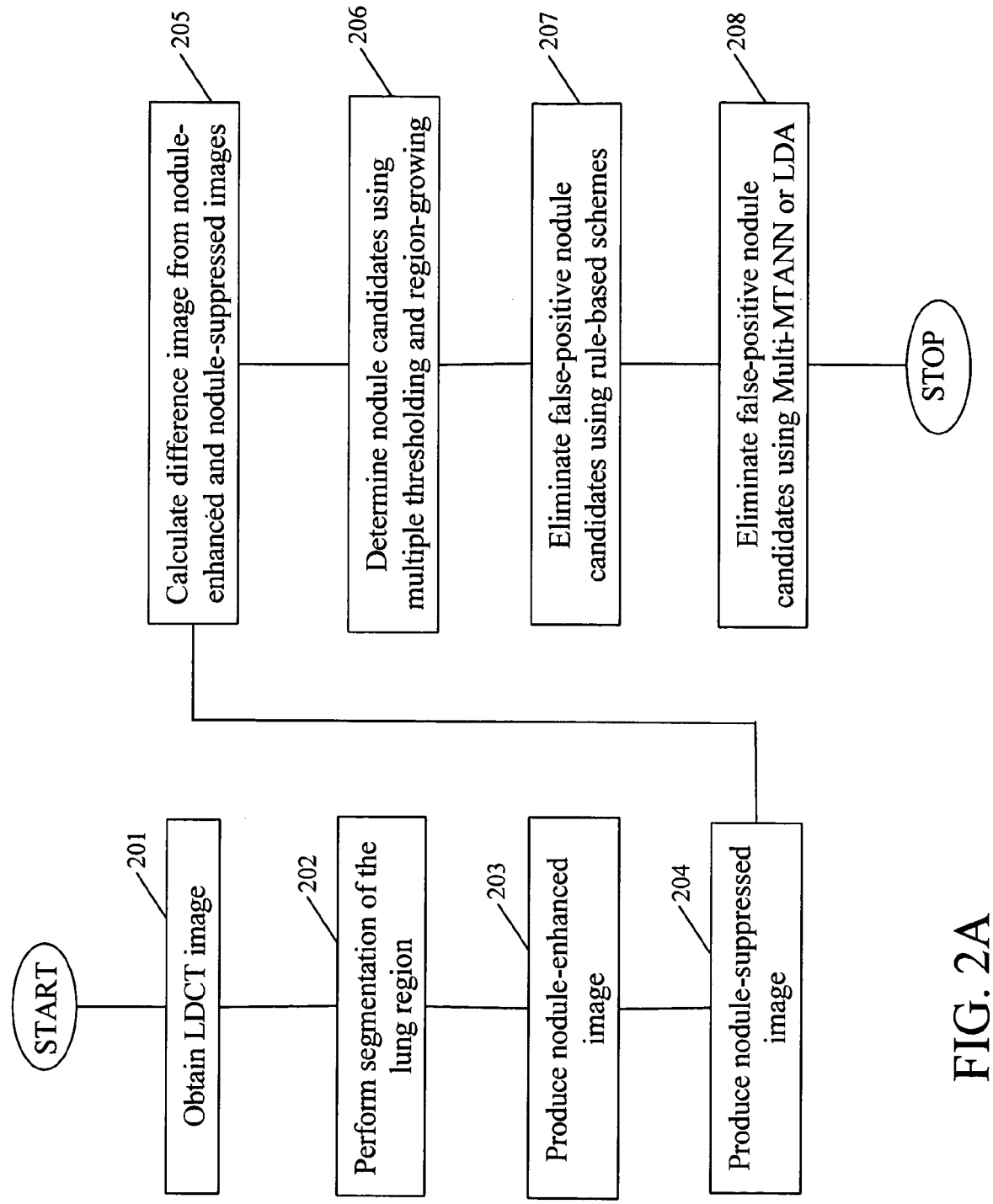
FIG. 2A illustrates the method for the detection of pulmonary nodules on LDCT images according to the present invention.

Referring now to the drawings, wherein like reference numerals designate identical or corresponding parts throughout the several views, FIG. 2A illustrates the method for detecting pulmonary nodules on LDCT images according to the present invention. The present method is based on a difference-image technique [15-17] in which structures similar to nodules are enhanced, and most of the background normal structures, such as small vessels or background noise, are suppressed.

In step 201, a medical image (e.g., a LDCT slice image) of the lungs is obtained. The medical image may be obtained directly from a CT scanner or from a medical image database.

In step 202, the left or right lung region of the medical image obtained in step 201 is segmented by use of a linear discriminant method on the histogram of CT values [20], wherein a threshold CT level is automatically determined for dividing a body region into lung regions and other tissue regions. For smoothing the outline of the segmented lung and filling in holes in the segmented lung, a morphological operation and an image restoration technique [21] using the lung outline may be applied sequentially to the initially segmented lung. If the area of the segmented lung is smaller than a predetermined, empirically-determined value (e.g., 450 mm$^2$), the slices with the smaller lungs are not applied for subsequent processing.

In steps 203-205, a difference image is obtained from the medical image. Each CT slice image is processed by two different filtering operations. In step 203, nodules are enhanced by use of a matched filter (e.g., 8 mm nodule shape), while in step 204, nodules are suppressed using a ring average filter (e.g., 13 mm outside diameter and 0.6 mm width) [17]. Steps 203 and 204 are described in more detail below. The difference image is then obtained in step 205 by subtracting the nodule-suppressed image from the nodule-enhanced image.

Figure 3:
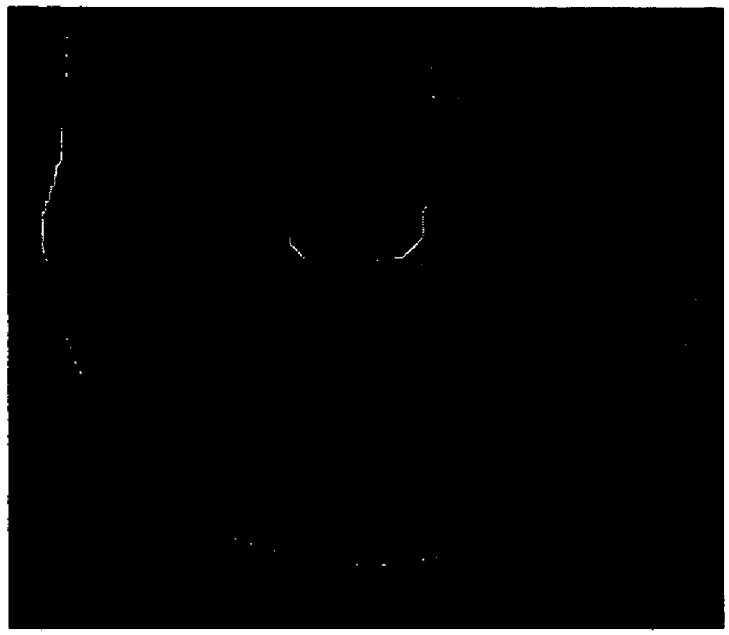
FIG. 3 shows an original CT image with a missed cancer partially overlapped with a small parallel vessel and the corresponding difference image.
Figure 3:
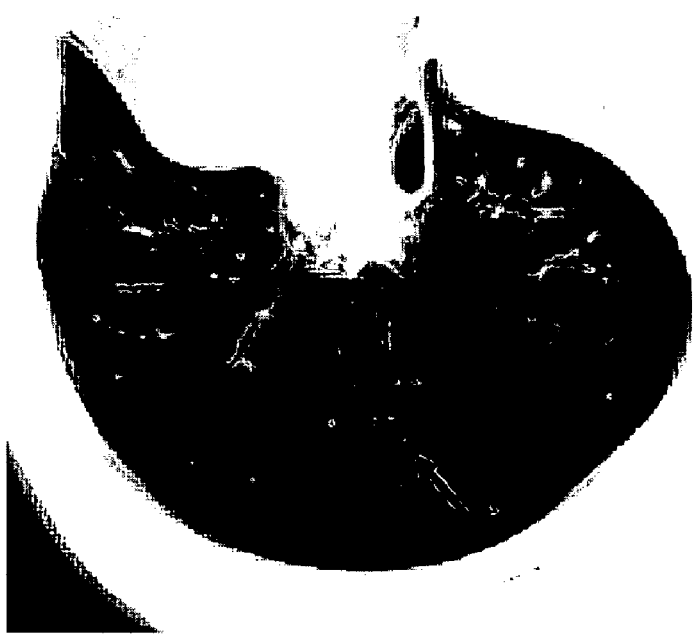

The effect of using the difference-image technique is shown in FIG. 3, which depicts an original CT image with a missed cancer (i.e., a detection error) overlapped with pulmonary vessels, and the corresponding difference image, in which the cancer was enhanced and small vessels were suppressed.

In step 206, initial nodule candidates are selected in the difference image by use of a multiple-gray-level thresholding technique. Regions representing nodule candidates are determined by monitoring morphological features using a region-growing technique.

Next, in step 207, false positives among the nodule candidates are reduced by applying two rule-based schemes, one on the entire lung region, and another on divided lung regions.

Finally, in step 208, a classifier is used to further remove false positives. Classifiers used in step 208 could include: (1) a pattern-classification technique based on an artificial neural network (ANN) called a massive training artificial neural network (MTANN) [22-25], and (2) linear discriminant analysis (LDA). By comparing the free-response receiver operating characteristic (FROC) curves obtained using the classifiers, the usefulness of the classifiers can be examined.

Steps 206-208 are described in more detail below.

In step 206, multiple-gray-level thresholding is applied to the difference image for identification of initial nodule candidates [17]. Each threshold level is determined according to a certain specific percentage of the area under the pixel-value histogram in the difference image from the high end of the histogram. For example, 3% and 27% were empirically selected as the beginning and ending percentage threshold levels, respectively, with an increment of 3%. The regions in the difference image above a certain threshold value are called "islands." In a study of the present method, islands with effective diameters smaller than 3 mm were excluded because the effective diameters of all cancers used in the study were larger than 6 mm. At the first percentage threshold level in which each island emerged, the effective diameter and the degree of circularity for the island are determined for selection of initial nodule candidates, because most of the nodules in the difference image are enhanced as being round, and the enhanced non-nodules, such as large vessels parallel to the cross-section, are not round and are larger than the nodules. The effective diameter of a candidate is defined by the diameter of a circle with the same area as that of the candidate. The degree of circularity was defined by the fraction of the overlap area of the circle with the candidate area. The first percentage threshold level is called a "starting percentage threshold level." If the feature values of the island satisfy each rule for picking up the nodule candidate at each starting percentage threshold level, the island is considered an initial nodule candidate. A candidate selected at a starting percentage threshold level is not examined again at subsequent percentage threshold levels.

To obtain the image features of the candidates for subsequent rule-based schemes (step 207), the candidate regions are determined by applying a region-growing technique to the difference image and monitoring morphological image features. The region growing starts at the location where the pixel value is a maximum within the area of the candidate, and is performed at various gray levels, which are decreased from each previous gray level with a decrement of a pixel value of (for example) 5 for low contrast candidates or a pixel value of (for example) 10 for high-contrast candidates. At each gray level, the grown region of the candidate was quantified by the morphological image features, i.e., effective diameter, circularity, and irregularity. The degree of irregularity was defined as 1−(P/N), in which P is the perimeter of the circle and N is the length of the candidate outline. At a certain gray level, the effective diameters or the irregularity of many candidates tends to increase rapidly, but the circularity decreases steeply. This abrupt change in the size and shape of the candidate indicates that the candidate island is merging with its surrounding background structures after that gray level. Therefore, at this transition point, the candidate regions and the morphological image features are determined. The transition point is defined at the gray level when the circularity decreases by more than 0.15, or when the irregularity or effective diameter increases by more than 0.20 or 5 mm, respectively. If the transition point is not detected, the candidate regions are determined when the circularity decreases below 0.6, or when the effective diameter increases above 10 mm. For the candidate for which the change does not occur, the candidate regions are determined as the last grown region.

In step 207, two rule-based schemes are applied for the removal of a number of false positives in the entire lung regions and in the divided lung regions (inside and outside regions). In the first rule-based scheme for the entire lung regions, the contrasts of the candidates on the difference image and original image, the standard deviation (SD) and contrast of pixel values in the outer region of a candidate on the original image, as well as the morphological features (i.e., the effective diameter, circularity, and irregularity of the candidate region) are determined as described above. Note that the SDs and contrasts in the outer regions for candidates which are branching points of parallel vessels can be greater than those for nodules. The contrast of a candidate is defined as the difference between the maximum pixel value and the minimum pixel value of the candidate. The maximum pixel value of the candidate is obtained as the average pixel value in a 3×3 pixel area centered over the pixel with the maximum value. For determining the contrast on the original image, the pixel with the maximum value is searched for in an area of 11×11 pixels of the original image, centered over the pixel with the maximum value in the candidate on the difference image. The outer region of the candidate, where the SD and contrast are calculated, is defined as the outer region with a width of 3 pixels obtained from the candidate region by use of dilation of the morphological filter with a circle.

Figure 4A:
FIG. 4A shows outside and inside regions in a lung used for the determination of localized image features.
Figure 4B:
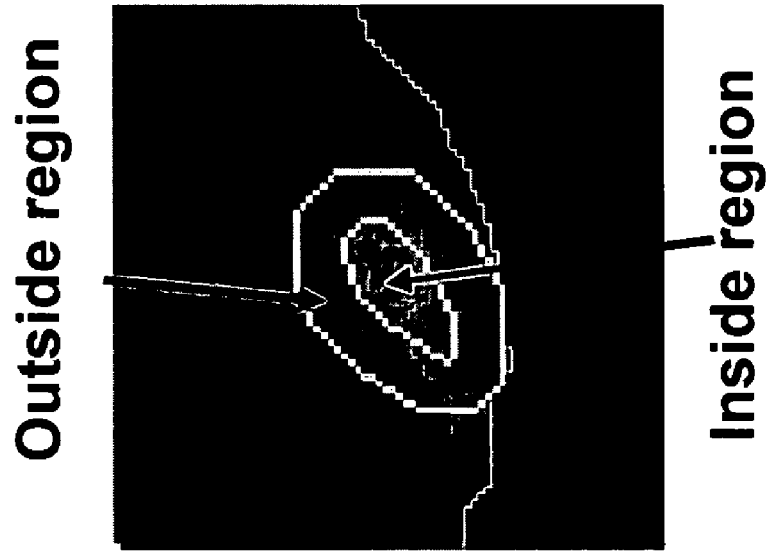
FIG. 4B shows outside and inside regions of a nodule candidate for determination of localized image features.
Figure 5A:
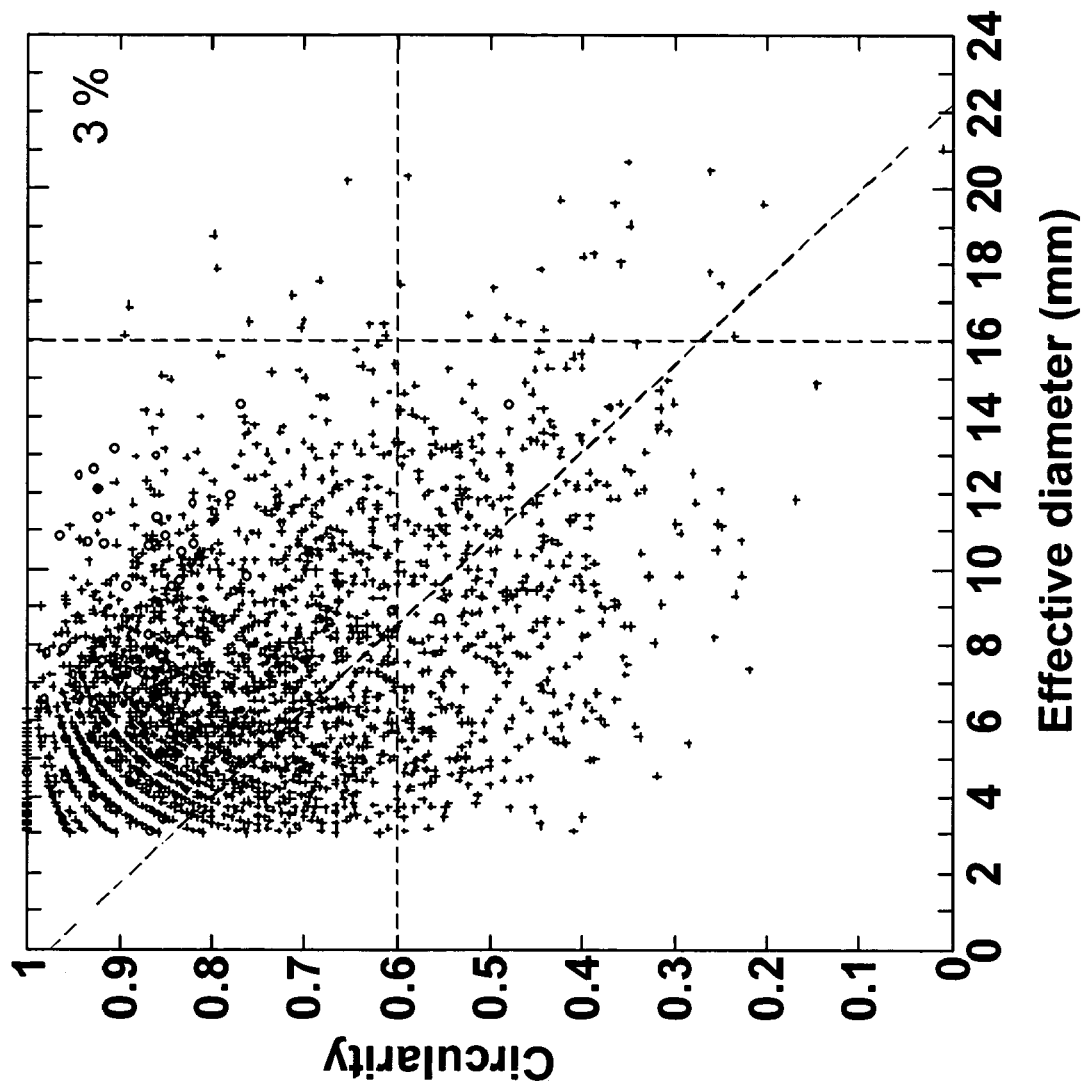
FIGS. 5A-5E illustrate the relationship between the effective diameter and the circularity of nodules (and false positives) at threshold levels of 3% (5A), 6% (5B), 9% (5C), 12% (5D), and 15% (5E), wherein closed and open circles represent missed cancers and detected cancers, respectively, small pluses represent false positives, and rules are indicated by dashed lines.
Figure 5B:
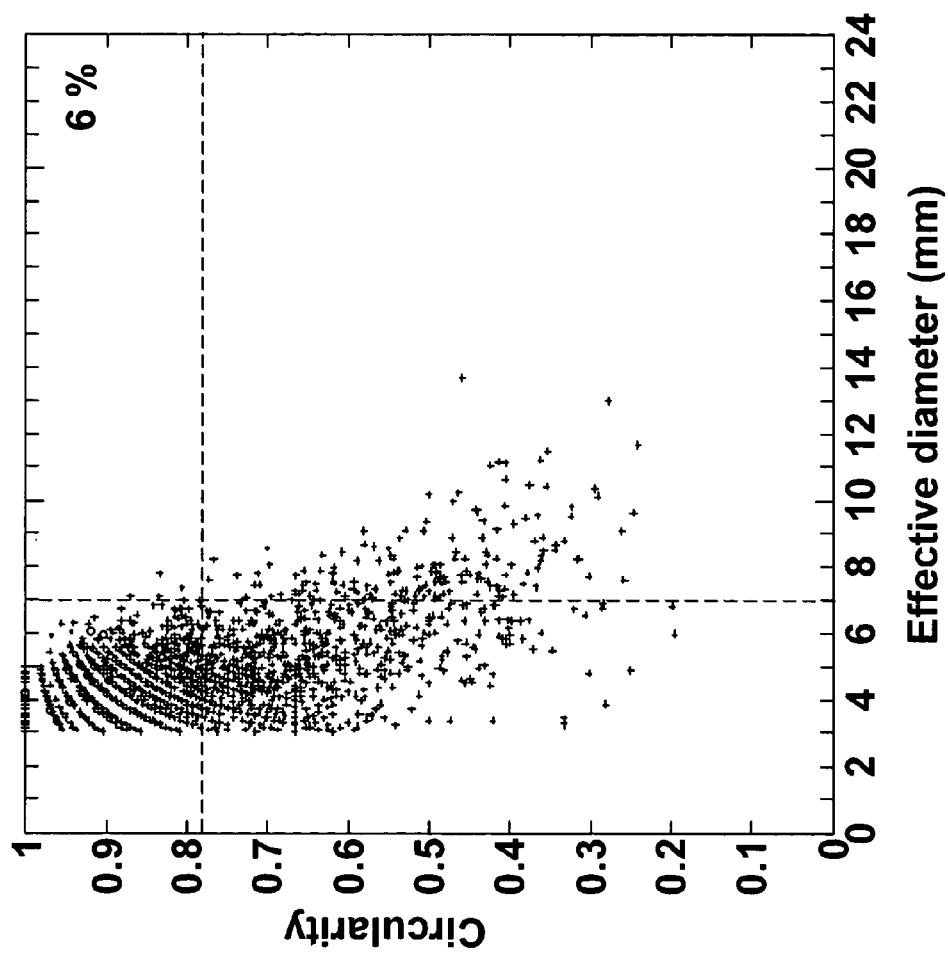
Figure 5C:
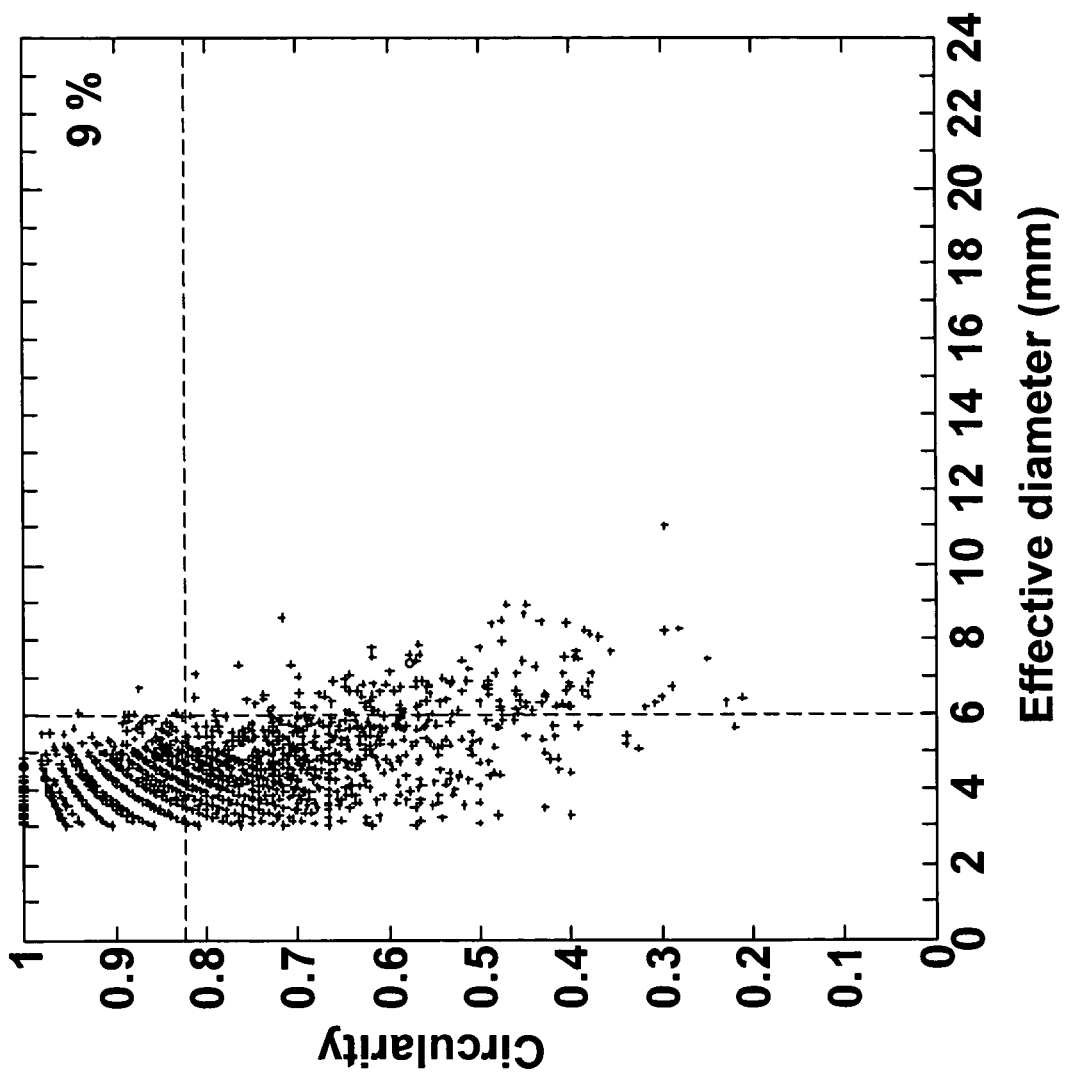
Figure 5D:
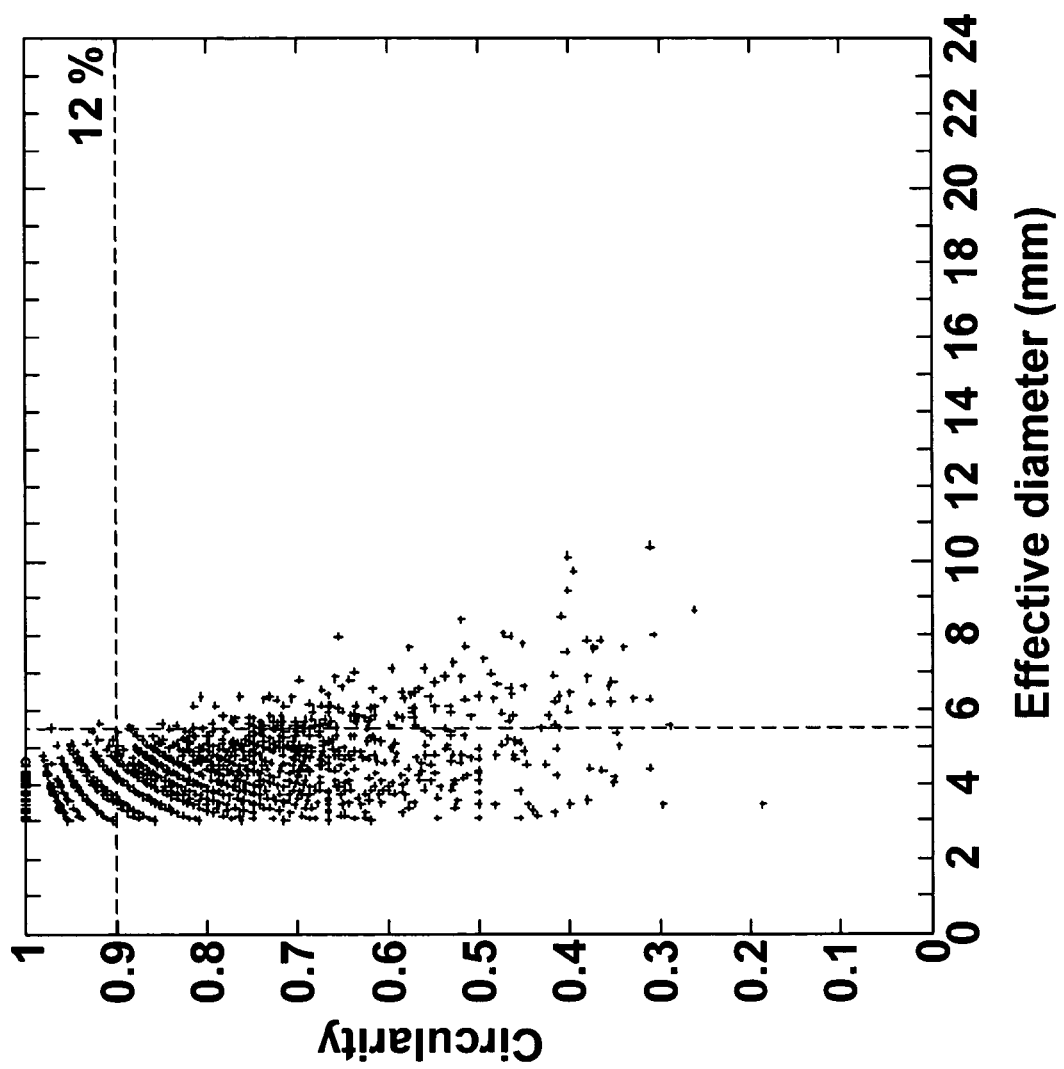
Figure 5E:
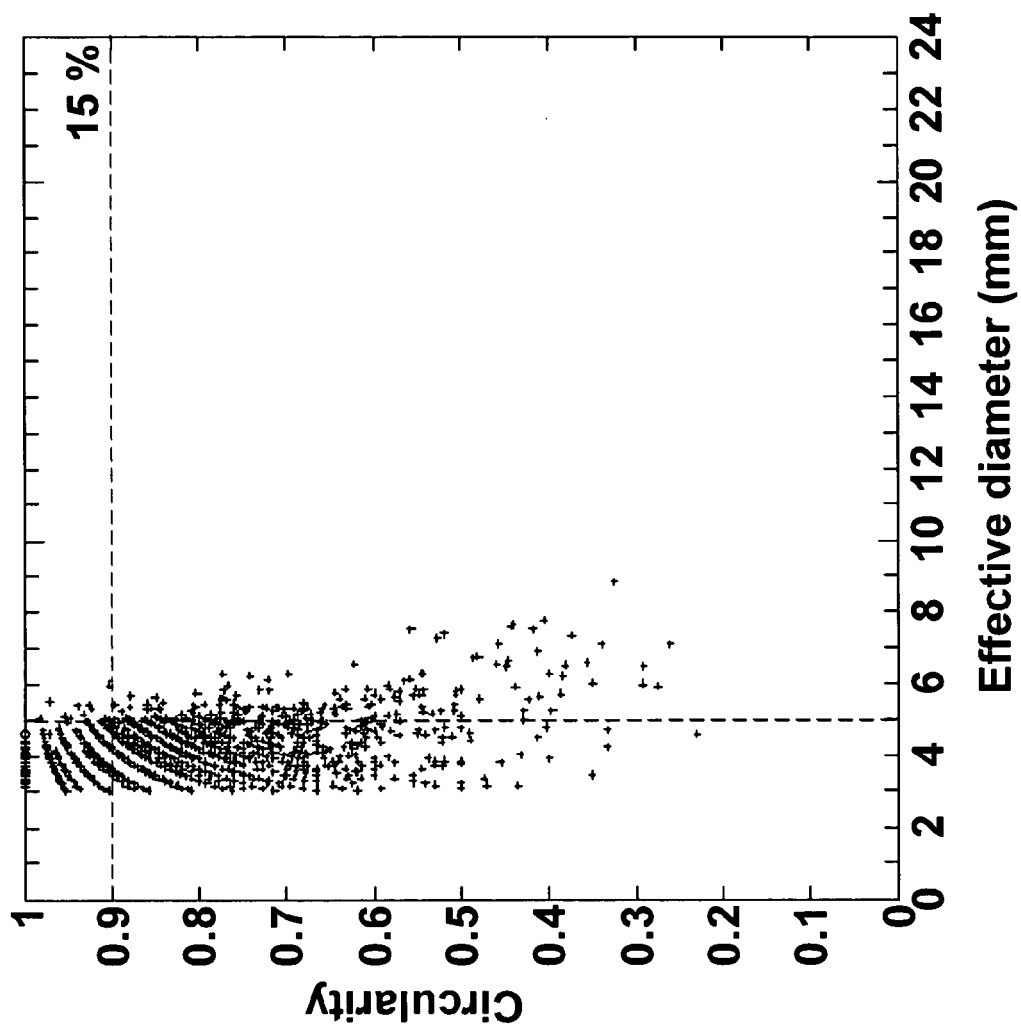

In the second rule-based scheme, respective rules based on localized image features obtained from nodule candidates are established in divided lung regions for removal of the remaining false positives. Each lung is divided into an outside region and an inside region, as shown in FIG. 4A. The outside region and the inside region in the lung are obtained by use of erosion of a morphological filter with a width of 10 mm, which is determined empirically. The characteristics of false positives in the outside region are different from those in the inside region. For example, the effective diameters of some false positives in the outside region, such as vessels parallel or vertical to a cross-section, tend to be smaller or larger than those of the nodules. To analyze the localized image features of nodule candidates, inside and outside regions of the nodule candidate are obtained as shown in FIG. 4B. Because the pixel value distributions in the inside or outside region for some false positives such as parallel vessels are different from those of the nodules, such false positives can be distinguished from nodules. The width of the outside region of the nodule candidate obtained by use of dilation of the morphological filter is 5 mm, which is determined empirically. Localized features calculated for the inside and outside regions of the nodule candidate are the average pixel value, full width at half maximum (FWHM) of the gray-level histogram, full width at tenth maximum (FWTM) of the gray-level histogram for the inside and outside regions, and the overlap area of gray-level histograms between the inside and outside regions, referred to as an overlap measure [26]. In addition, the cross-correlation value between the difference image and the original image is obtained for eliminating the false positives whose morphological appearance on the difference image changes from that on the original image; however, the morphological appearance of most nodules does not change appreciably. All of the above features, except the cross-correlation value, are calculated in the original images.

In step 208, to reduce the false positives of the nodule candidates in the final stage of the present method, a LDA classifier may be used [11, 13]. Recently, a pattern-classification technique based on an artificial neural network (ANN), called a massive-training artificial neural network (MTANN) [22-25], has been developed for the removal of various types of false positives. See co-pending U.S. patent application Ser. No. 10/366,482 (Method of training Massive Training Artificial Neural Networks (MTANN) for the detection of abnormalities in medical images), the contents of which are incorporated herein by reference. In the present method, a MTANN and a LDA are separately used as classifiers, and the overall performance is shown using FROC curves, which are determined by changing the threshold for the Multi-MTANN score or the LDA score. Finally, the higher sensitivity and lowest number of false positives in the two FROC curves are selected, and the final nodule candidates are determined.

The MTANN consists of a modified multilayer ANN, which is capable of operating on an original image directly. The MTANN is trained using a large number of sub-regions extracted from input images, together with the teacher images containing the distribution for the "likelihood of being a nodule." The output image is obtained by scanning an input image with the MTANN. The distinction between a nodule and a non-nodule is made using a score that is defined from the output image of the trained MTANN. The Multi-MTANN for eliminating various types of non-nodules consists of plural MTANNs arranged in parallel. Each MTANN is trained using the same nodules, but with a specific type of false positive, such as various sized vessels, and acts as an expert to distinguish nodules from the specific type of false positive. The outputs of the MTANNs are combined by use of the logical AND operation so that each of the trained MTANNs does not eliminate any nodules, but removes some of the various types of false positives. Typically, 15 MTANNs are configured, and the Multi-MTANN is trained with 10 nodules (true positives) and 150 false positives, which are produced by the second rule-based scheme with the missed cancer cases.

To select the most effective image feature combination for separating the remaining candidates into true nodules and false positives by use of a linear discriminant function, the ROC curve for distinction between nodules and false positives is determined. In addition, a stepwise method based on Wilks' lambda, which is defined by the ratio of within-group variance to the total variance [27] and the F value, which is a cost function based on Wilks' lambda, is used. In the stepwise method, each feature is added or removed one-by-one by use of two thresholds on the F value, one for removal and another for addition [28], and the $A_z$ value, i.e., the area under ROC curve, for each combination is computed for selection of the most effective feature combination with the highest Az value. Consequently, the final combination consists of a starting percentage threshold level, effective diameter on the difference image, circularity on the difference image, SD of pixel values in the outer region of the candidate on the original image, overlap measure, average pixel value in the inside region, and FWTM in the inside region. For determining the FROC curve of the CAD scheme using the LDA, a round-robin method per patient-basis (or leave-one-out-by-patient) is employed. With this method, all candidates except for candidates obtained from the same patient are used for training, and candidates left out are used for testing the linear discriminant function. This procedure is repeated for all candidates, so that each candidate is used once as a test candidate.

Figure 2B:
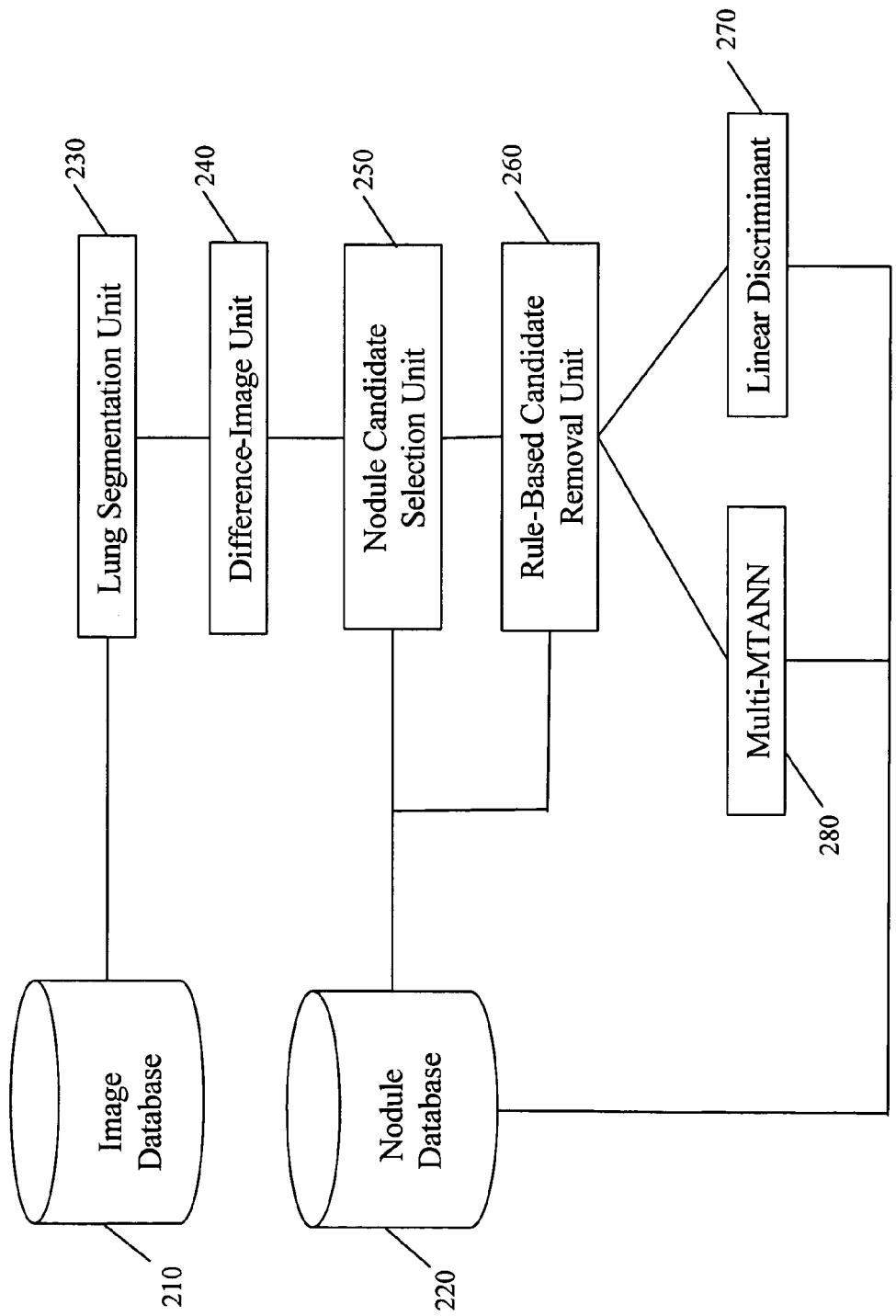
FIG. 2B illustrates a system for the detection of pulmonary nodules on LDCT images according to the present invention.

FIG. 2B shows a system for the detection of lung nodules according to the present invention. Lung Segmentation Unit 230 obtains a medical image from a CT scanner (not shown) or from Image Database 210. Difference-Image Unit 240 produces a difference image based on filtering the medical image in two different ways and obtaining the difference, as described above. The difference image produced by the Difference-Image Unit is used by the Nodule Candidate Selection Unit 250 to obtain initial nodule candidates according to the method described with reference to step 206 of FIG. 2A. Nodule candidates are stored in Nodule Database 220. False-positive nodules are removed from the candidate nodules by the Rule-Based Candidate Removal Unit 260 using various morphological and contrast feature values. The remaining nodule candidates are classified as nodules/non-nodules by Linear Discriminant Classifier 270 and Multi-MTANN 280.

The method for nodule detection in low-dose CT images according to the present invention was applied to a cancer database of 106 scans (total number of slices: 3,292) with 131 nodules including 71 detected cancers and 38 missed cancers. The database of 106 LDCT scans used for this study was acquired on a mobile, low-dose helical CT scanner (CT-W950SR; Hitachi Medical, Tokyo, Japan) from 73 lung cancer patients obtained in a lung cancer screening program in Nagano, Japan (1996-1999) [18], [19]. All scans were acquired according to a low-dose protocol at a tube voltage of 120 kV, a tube current of 25 mA or 50 mA, 10 mm collimation, and a 10 mm reconstruction interval at a helical pitch of two. The number of CT slices per patient used for this study was 31 or 33, and the database included 3,292 slices. Each image was 512×512 pixels, with a pixel size of 0.586 mm or 0.684 mm, and the number of gray levels was 4096.

Each of the 73 patients whose screening CT data were used in this study had at least one cancer. All cancers were intrapulmonary and were subsequently confirmed to be lung cancers based on results of biopsy or surgery. Cancers larger than 30 mm were excluded, as well as central cancers (which are endobronchial tumors in or proximal to a segmental bronchus) from the original Nagano database [19].

Figure 1:
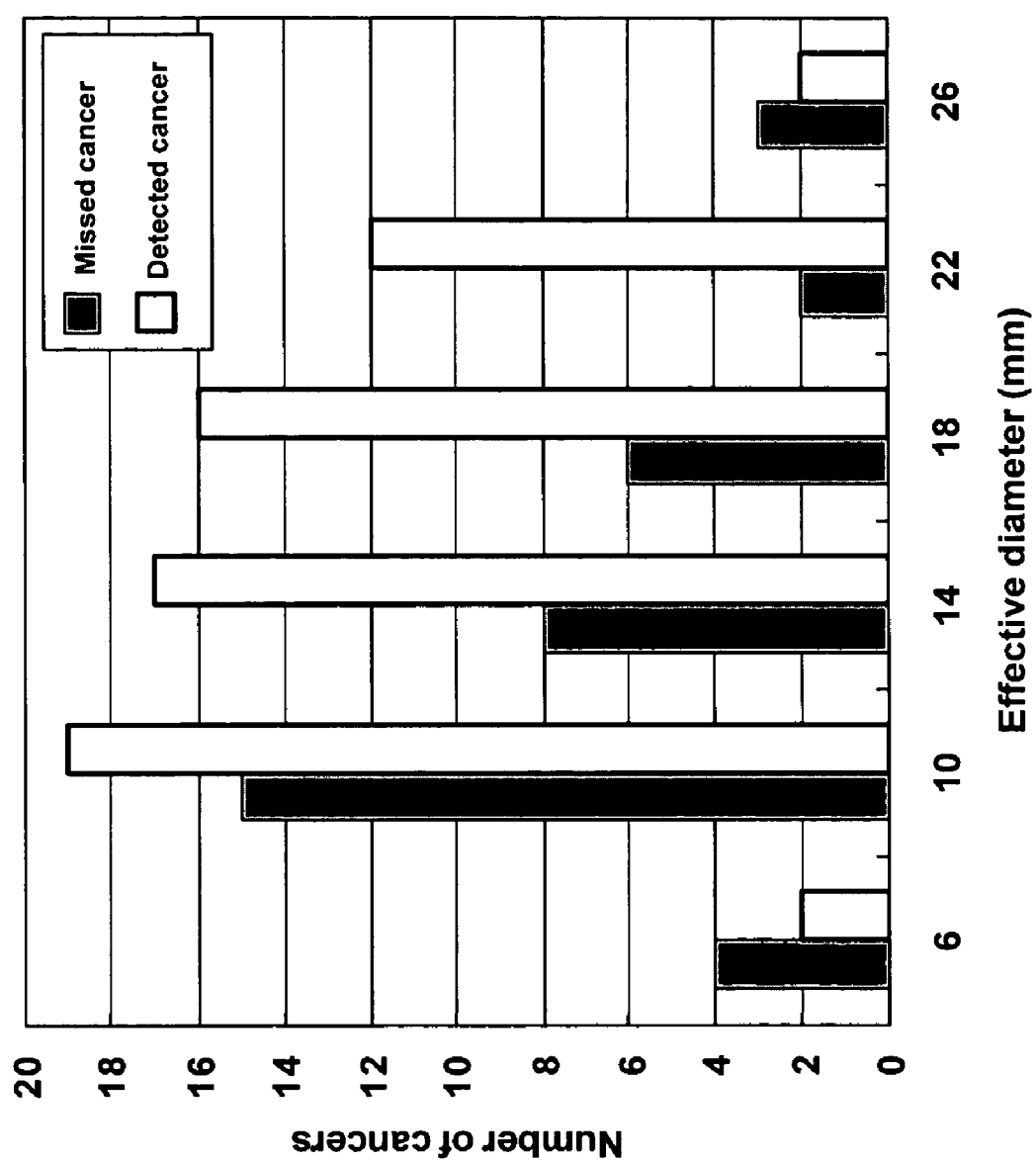
FIG. 1 shows distributions of nodule sizes for missed cancers and detected cancers in the lung cancer database used in a study of the method according to the present invention.

The database of 106 scans with 109 confirmed cancers consisted of 68 scans for 68 patients with 71 cancers, which were prospectively detected by radiologists, and also 38 scans for 31 patients with 38 cancers, which were retrospectively identified and considered "missed" due to detection error or interpretation error during clinical interpretation [19]. Twenty-three missed cancers identified as detection errors were not mentioned in the radiologists' reports, and 15 cancers identified as interpretation errors were reported but misinterpreted. Twenty-six of the 68 scans with the detected cancers were obtained from 26 missed cancer patients whose 26 cancers were detected subsequently by radiologists one or two years later. The database also included 22 other nodules, i.e., 13 confirmed benign nodules, 8 suspicious benign nodules, and one suspicious malignant nodule. FIG. 1 shows the distributions of nodule sizes (effective diameters) for the 71 detected cancers ranging from 6 mm to 24 mm, with a mean of 14 mm, and the 38 missed cancers ranging from 6 mm to 26 mm with a mean of 12 mm. The 131 nodules were found in 226 slices of a total of 3,292 slices, with some of the nodules existing in several slices. For the purpose of designing rules and evaluating results in this study, one CT slice was manually selected for each nodule. Consequently, the number of slices, where each nodule existed in one slice, was 127, since 4 slices included two nodules.

As a result of lung segmentation, 524 of the 3,292 slices with small lung areas were excluded prior to use of the difference-image technique. Therefore, the number of CT images calculated for nodule detection processing in this database was 2,768, where the numbers of slices with and without nodules were 226 and 2,542, respectively. As shown in FIG. 3, the missed cancer on the difference image was enhanced compared with that on the original image, and the small vessels adjacent to the nodule and background noise were suppressed. However, some of the large parallel vessels, vertical vessels, and lung edge regions were also enhanced, and were included as false positives in the initial nodule candidates. Because the difference-image technique was basically equivalent to a band-pass filter for enhancing the nodule-like objects, the vessels and lung edges were also enhanced with the filter.

FIGS. 5A-5E demonstrate the initial nodule candidate selection rules in the relationship between the effective diameter and the circularity at starting threshold levels of 3%, 6%, 9%, 12%, and 15%, respectively. These data for nodules and false positives were obtained for determination of the nodule candidate selection rules from CT slices with 131 nodules by eliminating the candidates with the effective diameters smaller than 3 mm. The minimum circularity rule for the nodules increased from 0.6 to 0.8 with an increase in the percentage threshold level. At a 15% threshold level, the minimum circularity rule for the nodules was 0.9. On the other hand, the circularities of false positives were frequently lower than those of nodules at each percentage threshold level, and the effective diameters of some false positives were larger than those of the nodules. Therefore, by using the cutoff rules of the circularity and the effective diameter by the dashed lines shown in FIG. 5A-5E, a number of false positives were removed at each percentage threshold level and initial nodule candidates were selected. Because the number of nodules which emerged at high percentage threshold levels of 18, 21, and 27 was only one, all nodule candidates at these levels were removed. After the initial pick-up of the nodule candidates, the two rule-based schemes were applied to remove false positives among the initial nodule candidates.

Figure 6A:
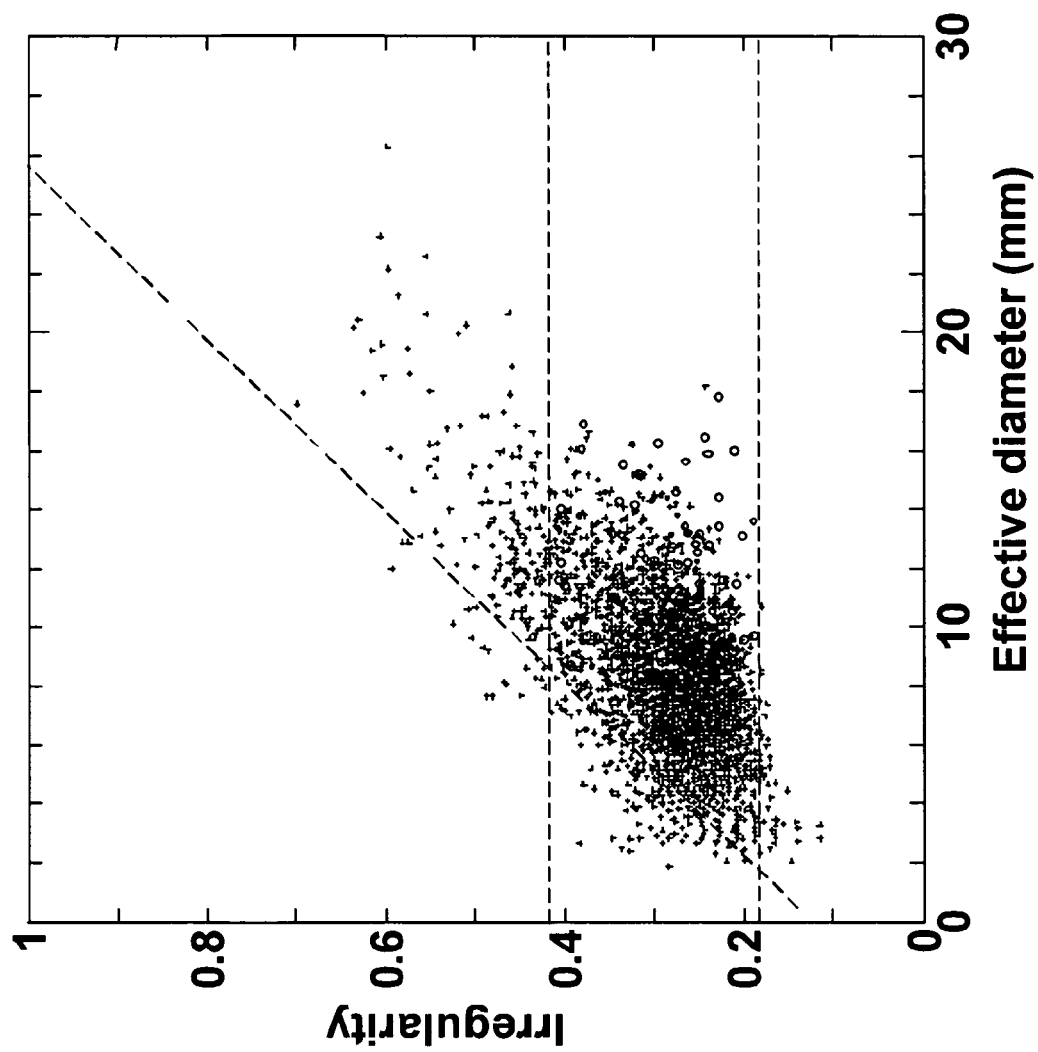
FIG. 6A shows the relationship between the effective diameter and the irregularity of nodule candidates, wherein closed and open circles represent missed cancers and detected cancers, respectively, small pluses represent false positives, and the rule is indicated by a dashed line.
Figure 6B:
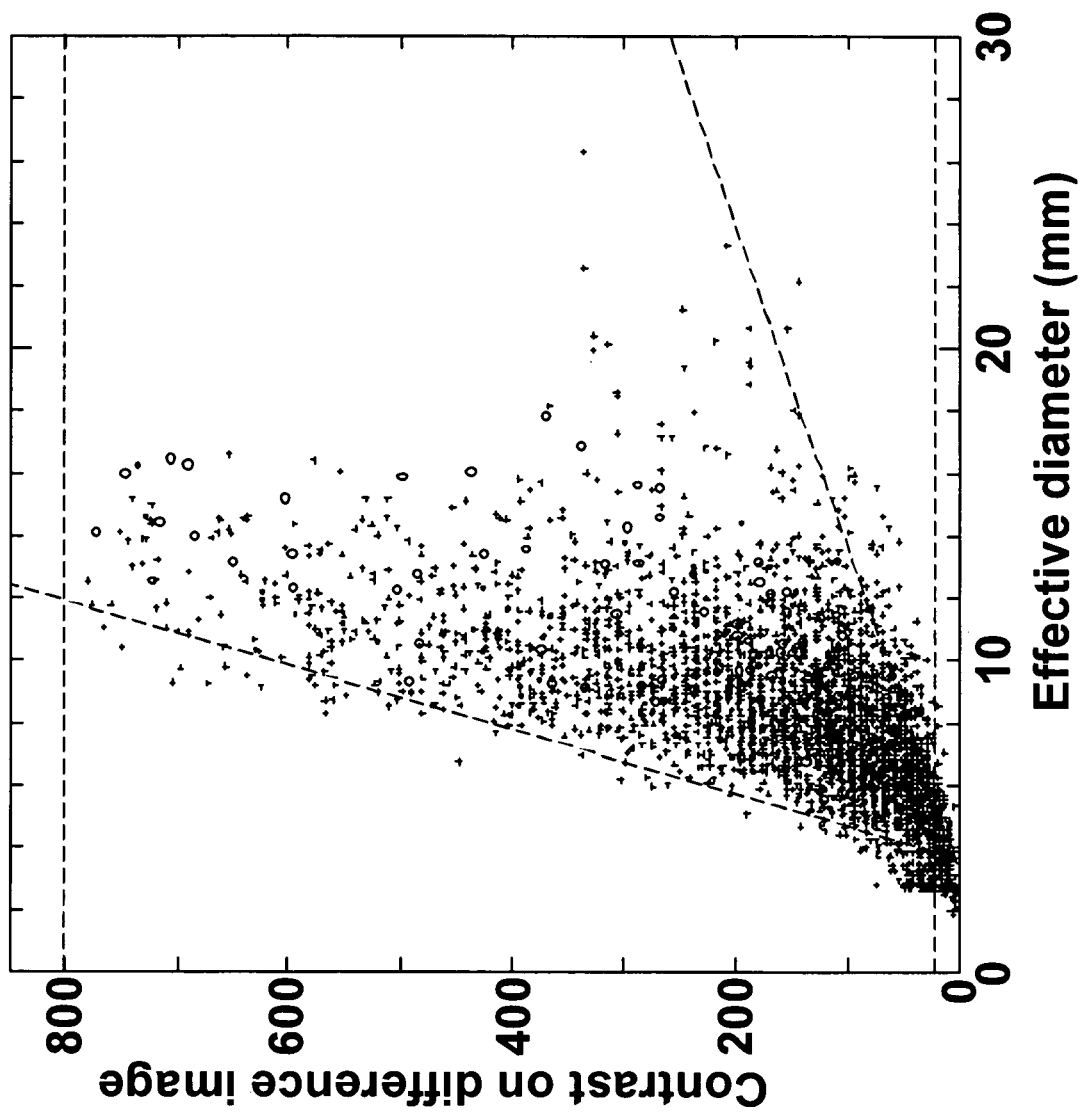
FIGS. 6B and 6C illustrate relationships between the effective diameter and the contrast of the nodule candidates on the difference image and the original image, respectively.
Figure 6C:
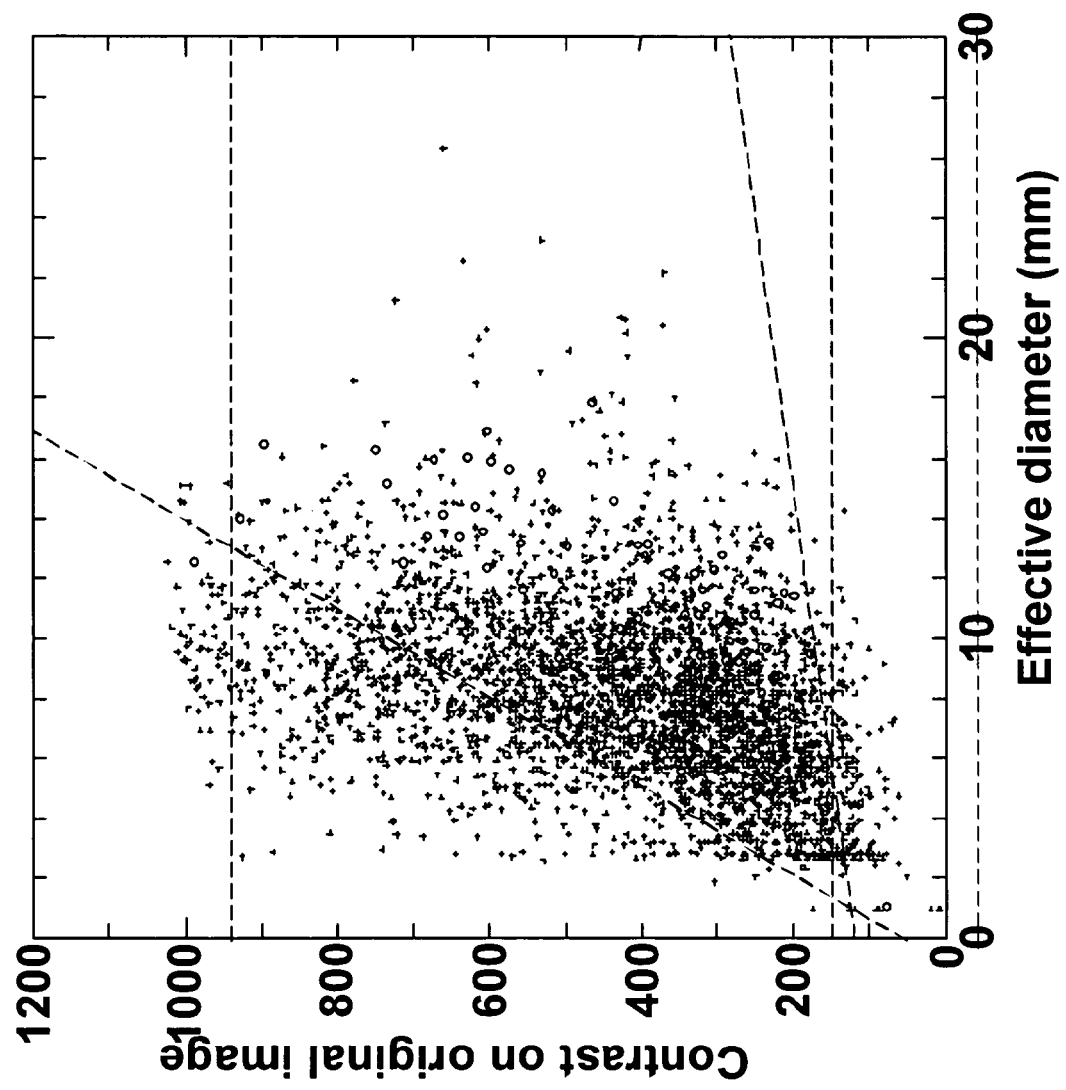
Figure 6D:
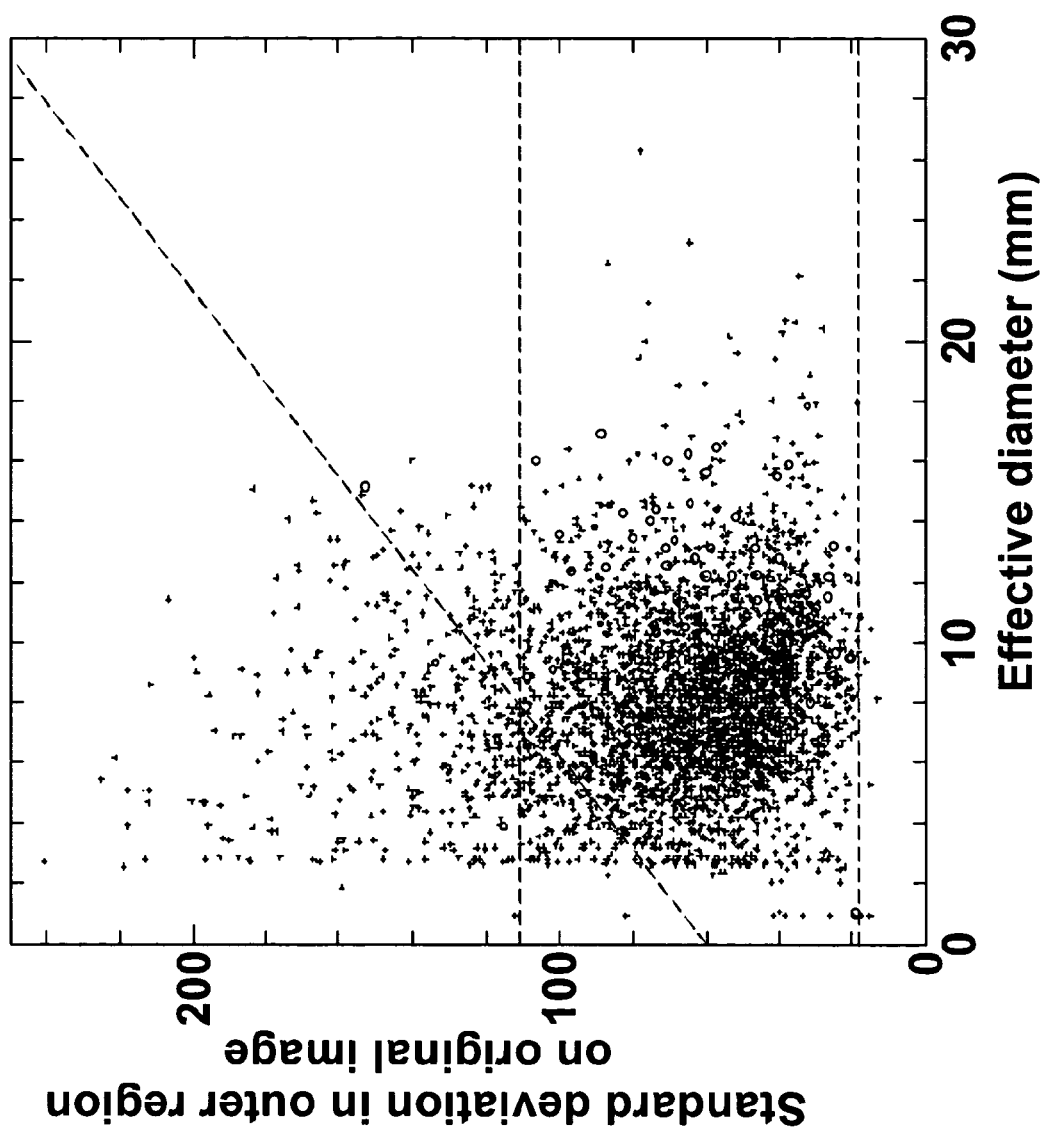
FIGS. 6D and 6E show the relationship between the effective diameter and the standard deviation of pixel values in the outer region of nodule candidates on the original image, and the relationship between the starting threshold level and the contrast in the outer region.
Figure 6E:
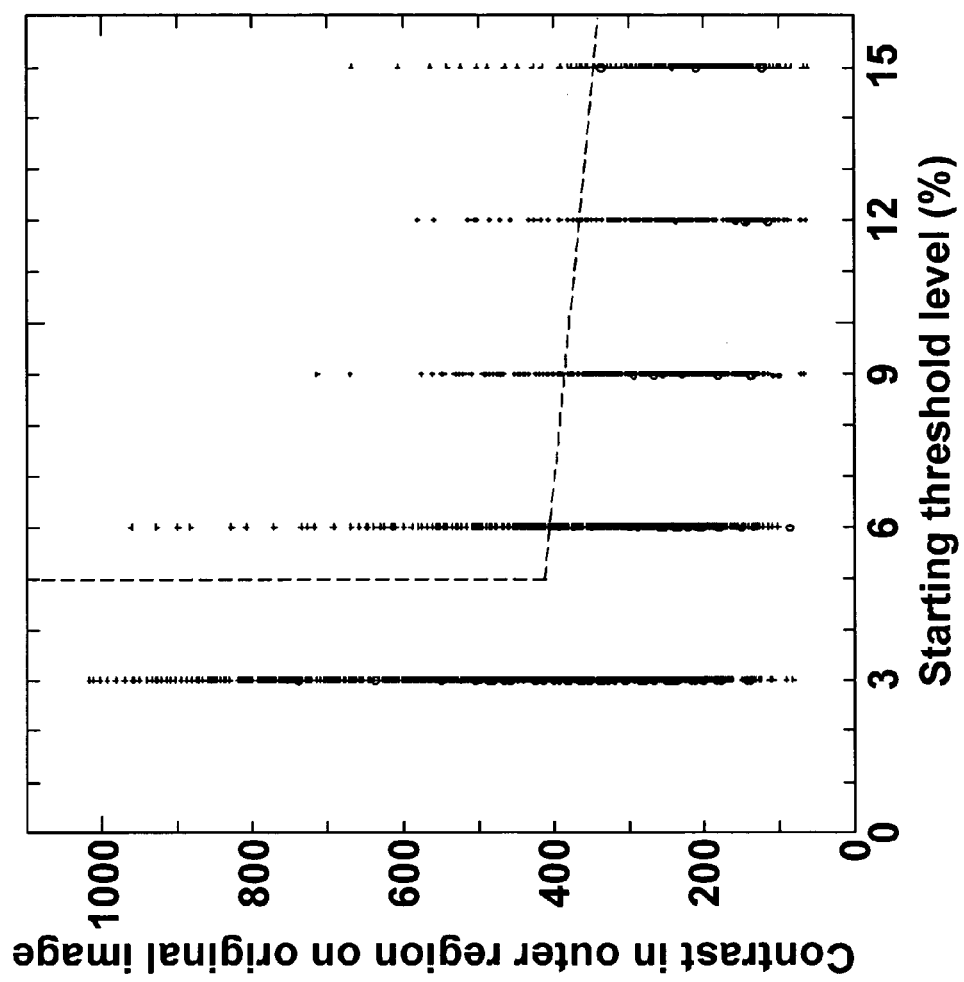
Figure 6F:
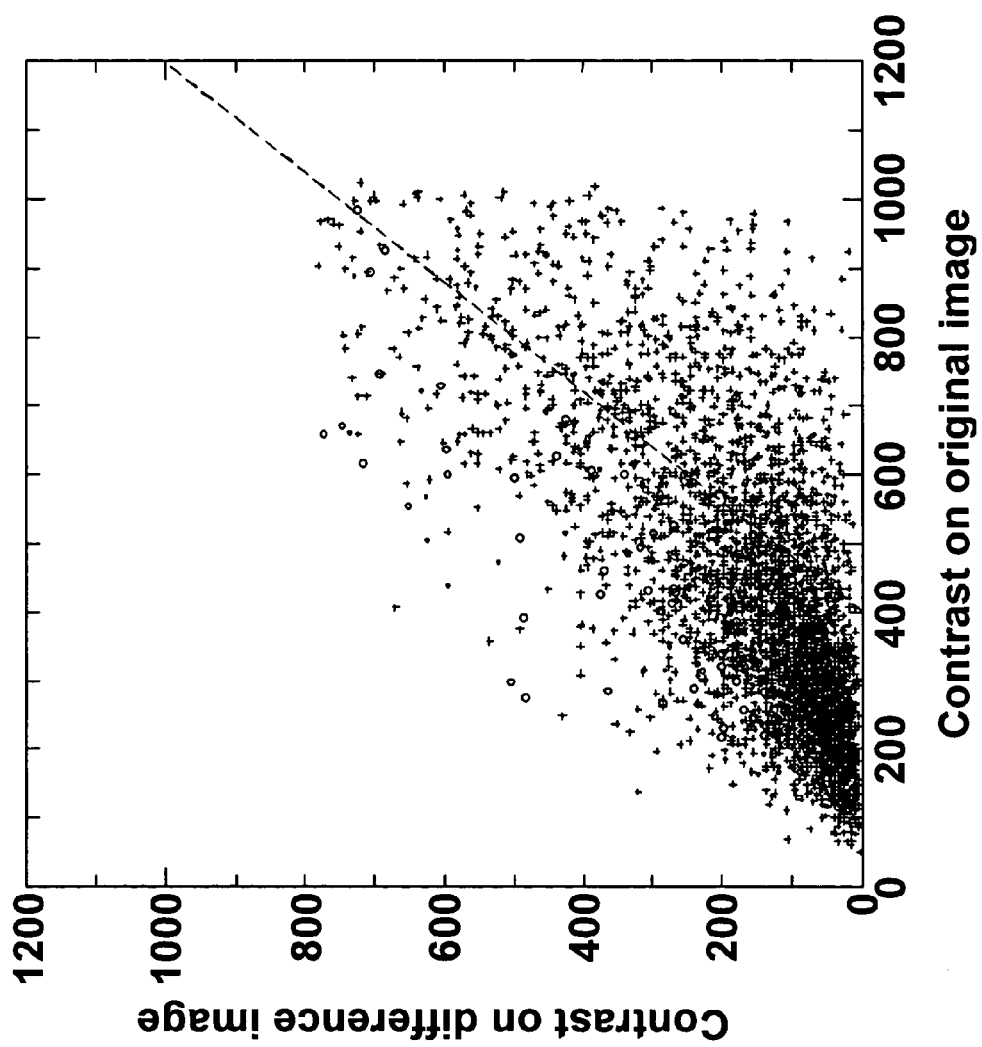
FIG. 6F illustrates the relationship between the contrast of nodule candidates on the original image and the difference image.

FIGS. 6A-6F show examples of the effective rules for removal of false positives used in the first rule-based scheme. FIG. 6A shows the relationship between the effective diameter and the irregularity of nodule candidates. Irregularities for some of the false positives such as vessels parallel to slices became greater compared with those of nodules. FIGS. 6A and 6B show the relationships between the effective diameter, and contrast of the nodule candidates on difference image and original image, respectively. In general, the larger the effective diameter of nodule, the greater the contrast becomes; however, the contrasts of some false positives were too large or too small compared with the expected variation. FIGS. 6D and 6E show the relationship between the effective diameter and the SD of pixel values in the outer region of candidates on the original image, and the relationship between the starting threshold level and the contrast in the outer region. As expected, the SDs or contrasts in the outer regions for some candidates were greater than those for nodules. FIG. 6F shows the relationship between the contrasts of nodule candidates on the original image and the difference image. Because most of the false positives were not similar to nodules, the contrast levels of some false positives such as pulmonary vessels were suppressed on the difference image. Consequently, the difference between the contrasts of such false positives in the original image and the difference image was greater than that of nodules. Thus, many false positives were removed by the rule, as shown by the dashed line in FIGS. 6A-6F.

Figure 7A:
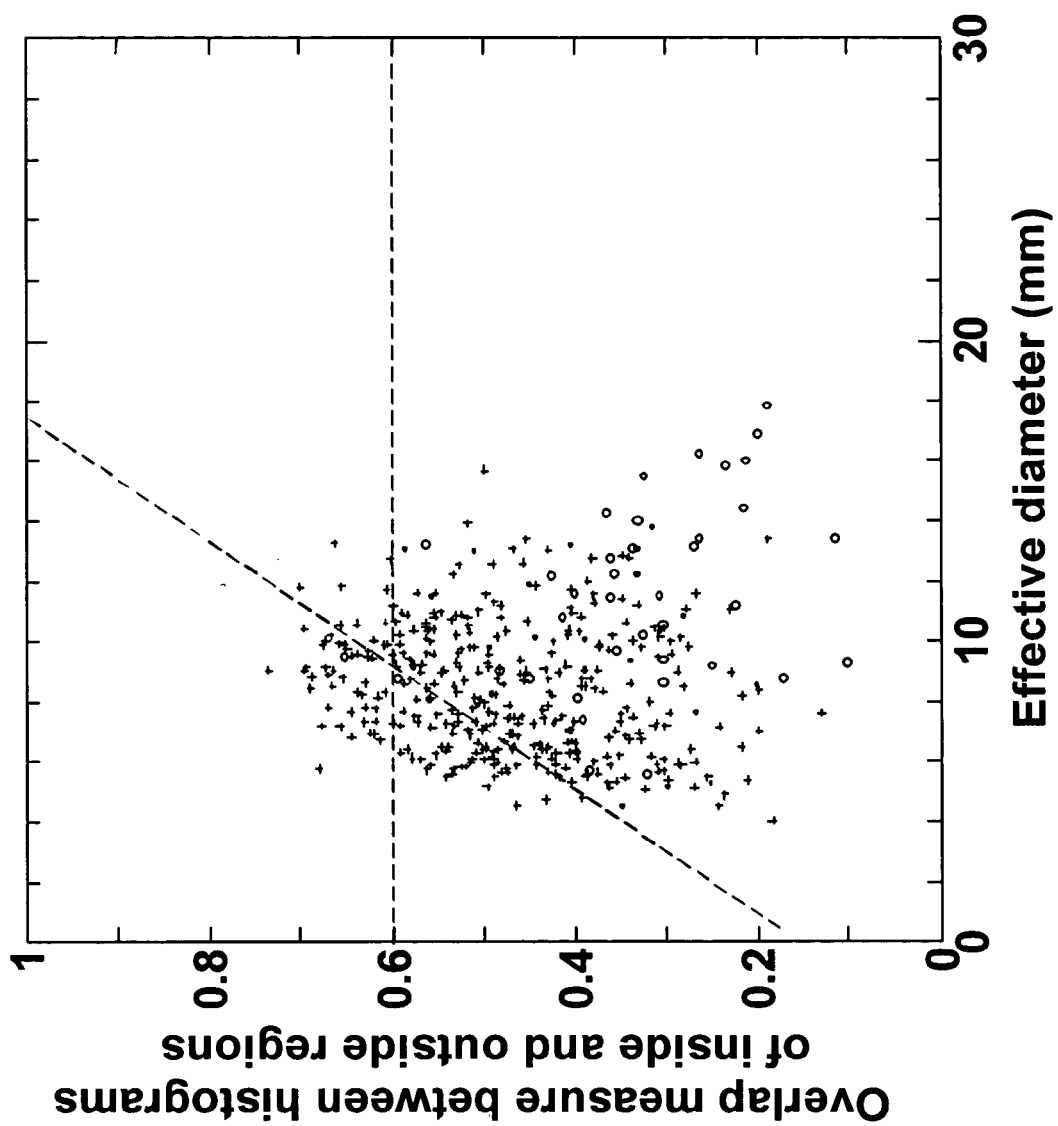
FIG. 7A illustrates the relationship between the effective diameter and the overlap measure between histograms of inside and outside regions of nodule candidates in the inside regions of the lung regions, wherein closed and open circles represent missed cancers and detected cancers, respectively, small pluses represent false positives, and rules are indicated by lines.
Figure 7B:
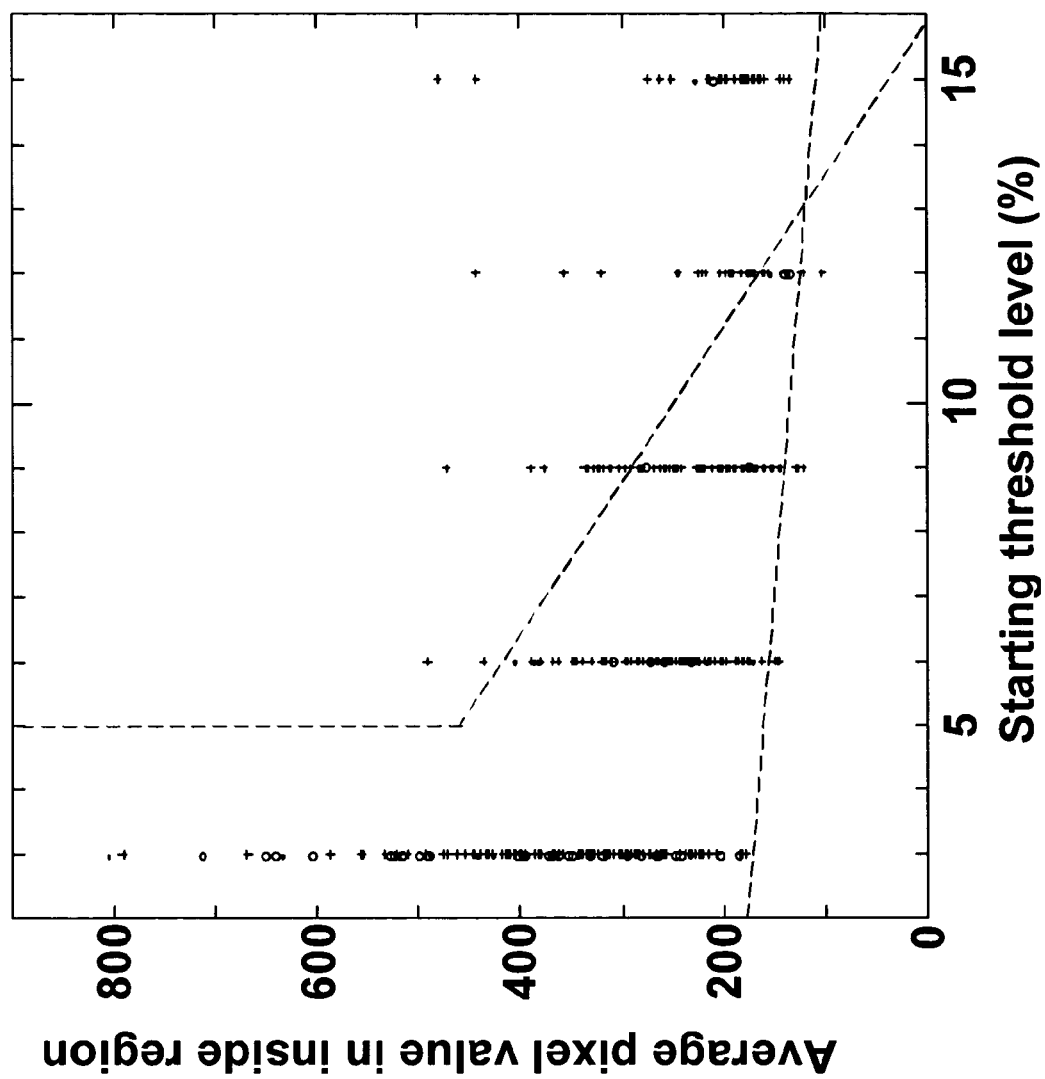
FIGS. 7B and 7C show the relationship between the starting threshold level, and the average pixel value in inside and outside regions of the nodule candidates in the inside regions of the lung regions.
Figure 7C:
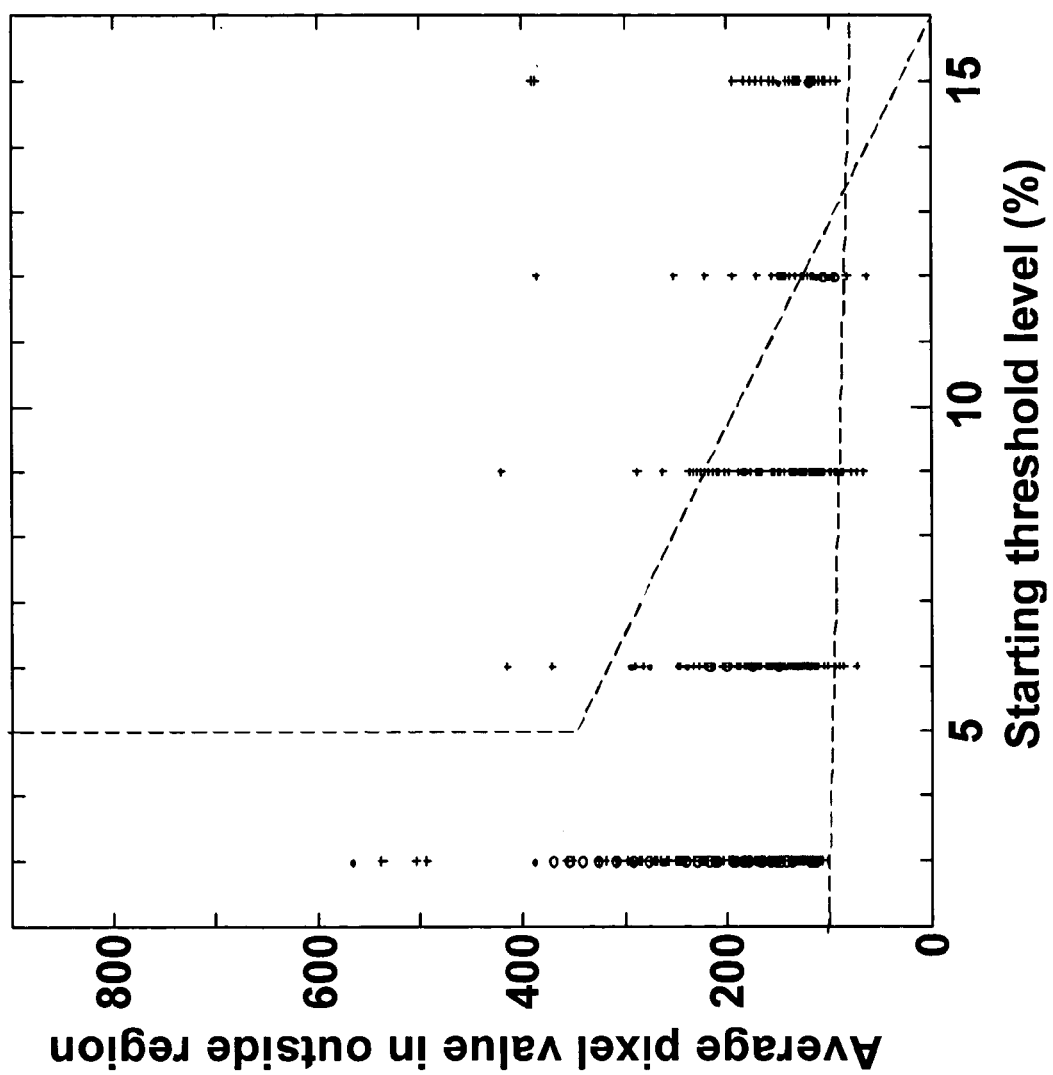
Figure 7D:
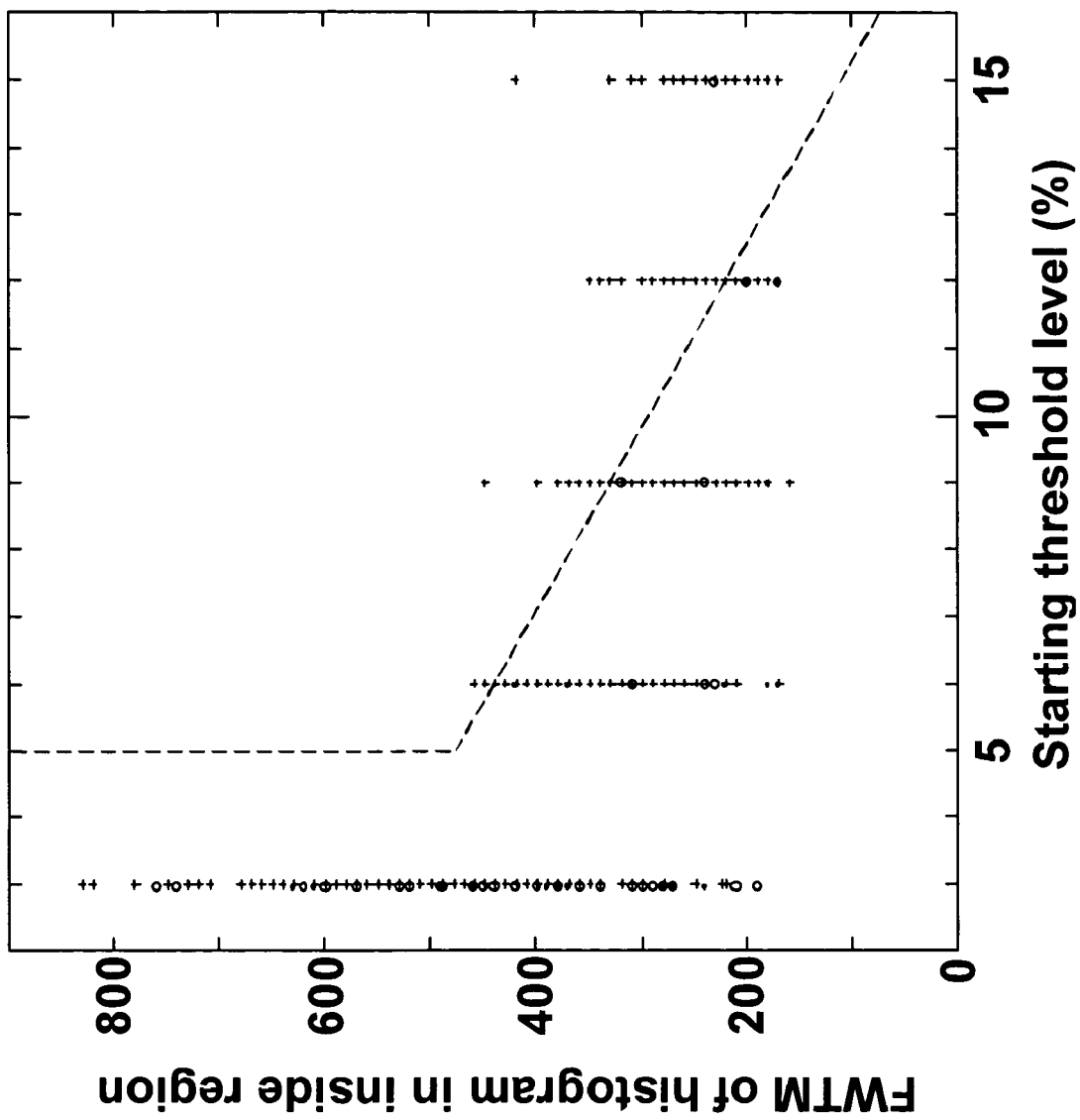
FIGS. 7D and 7E show the relationship between the starting threshold level and the FWTM of a histogram in the inside and outside regions of nodule candidates in the inside regions of the lung regions.
Figure 7E:
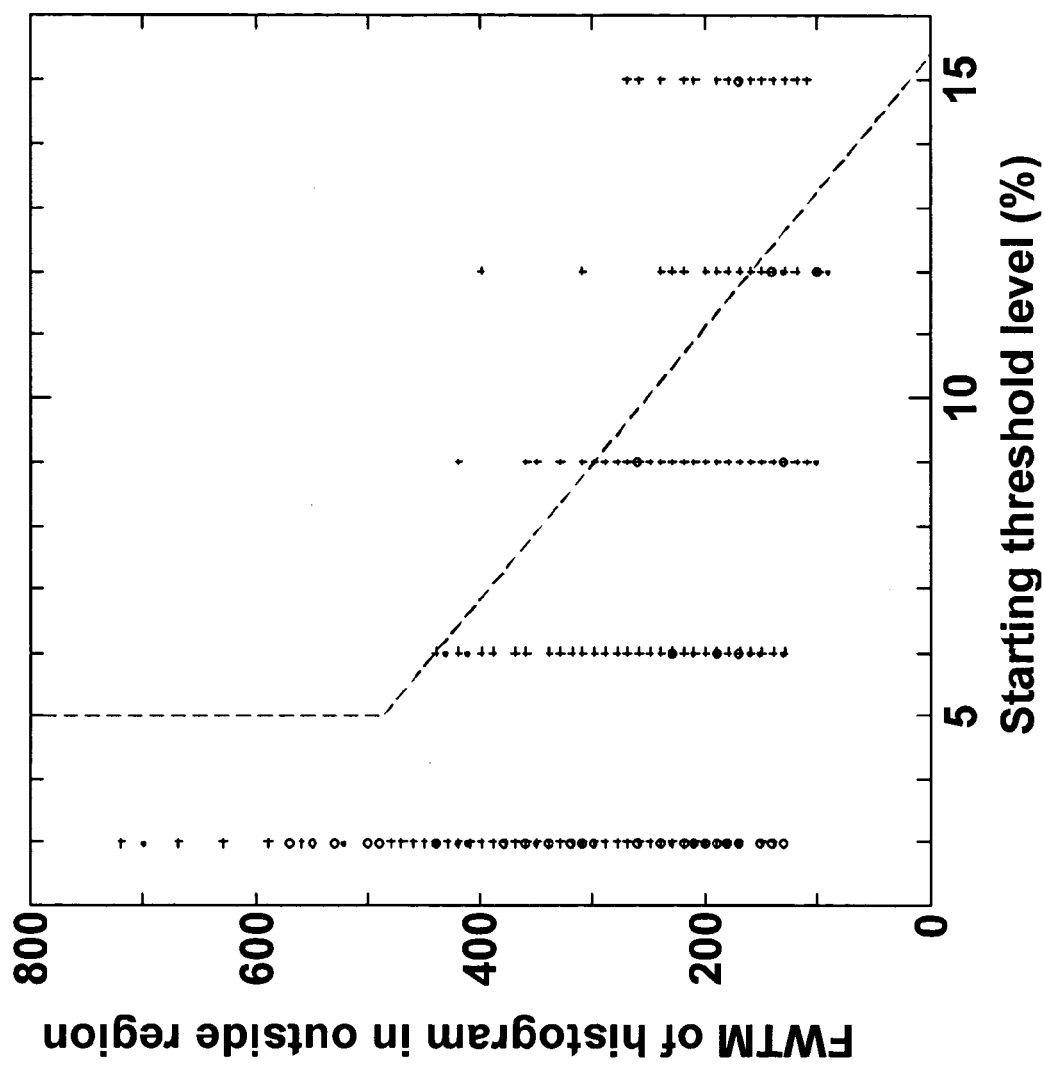
Figure 7F:
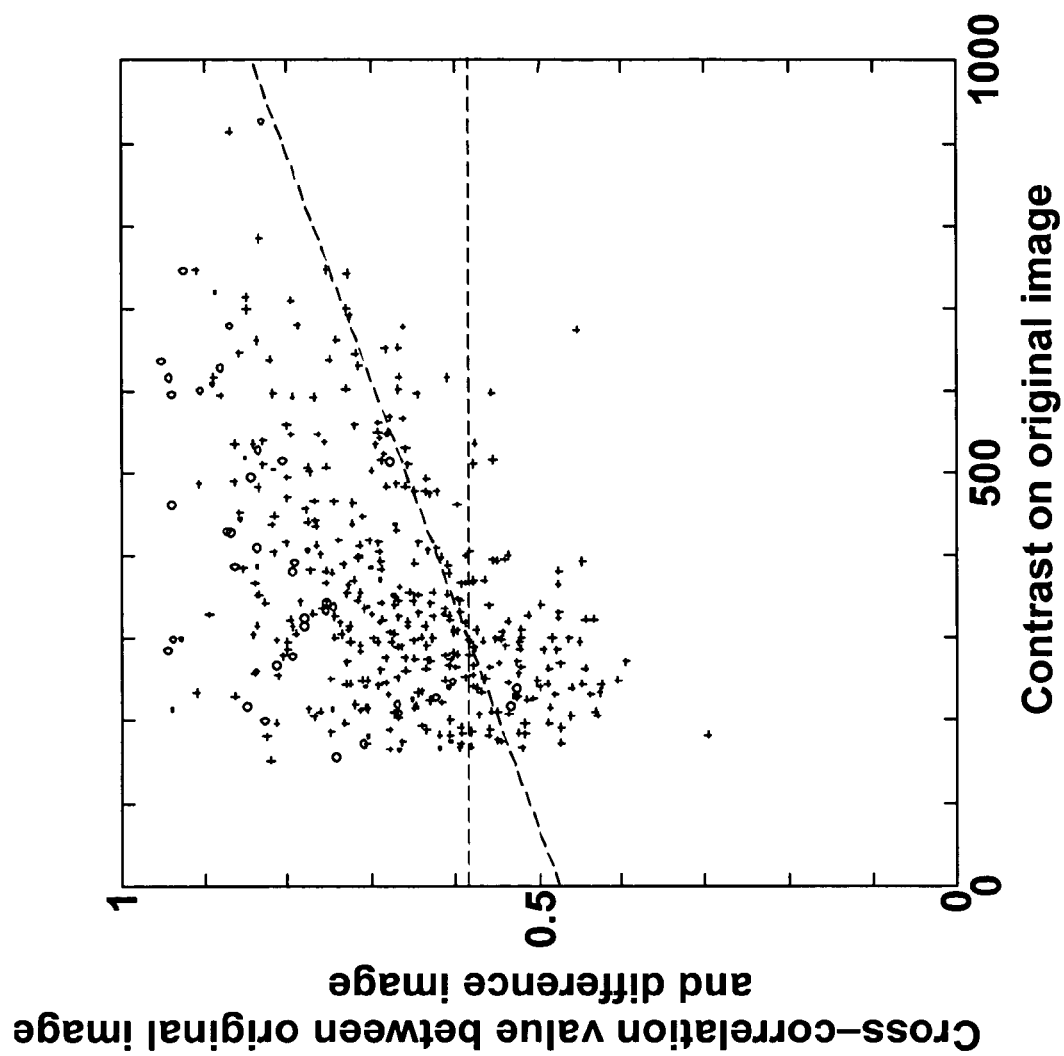
FIG. 7F illustrates the relationship between the contrast on the original image and the cross-correlation value between the original image and difference image in the inside regions of the lung regions.

FIGS. 7A-7F show examples of rules used in the second rule-based scheme. FIG. 7A shows the relationship between the effective diameter and the overlap measure between histograms of the inside and outside regions in the inside regions of the lung regions. At each effective diameter, the overlap measures of some false positives were greater than those of nodules. In the case of the candidates such as the branching point of parallel vessels, because the vessels extended from the inside region of the candidate to the outside region, the pixel-value histograms of the inside region for the branching point candidates were largely overlapped with those of the outside region, compared with those of nodules. FIGS. 7B and 7C show the relationship between the starting threshold level, and the average pixel value in inside and outside regions of nodule candidate, respectively. As the starting threshold level increased, the contrasts of the candidates became lower. Consequently, the ranges of average pixel values in both regions became small. FIGS. 7D and 7E show the relationship between the starting threshold level, and the FWTM of the histograms in inside and outside regions of nodule candidate, respectively. The FWTMs of histograms for candidates such as parallel vessels, especially branching points, became wider compared with those for the nodules. FIG. 7F shows the relationship between the contrast on the original image and the cross-correlation value between the original image and difference image. The morphological appearances for the false positives on the difference image changed from those on the original image, but the morphological appearance of most nodules did not change appreciably.

The sensitivity for all nodules and the number of false positives per scan in the computerized detection of lung nodules at various steps are summarized in Table 1. The detection sensitivity for all nodules decreased from 93% to 81% with three steps of false positive removal, whereas the number of false positives per scan was greatly decreased by each step. In the two rule-based schemes for false positive removal, the number of false positives per scan for all nodules decreased by 92% (316/343).

Figure 8:
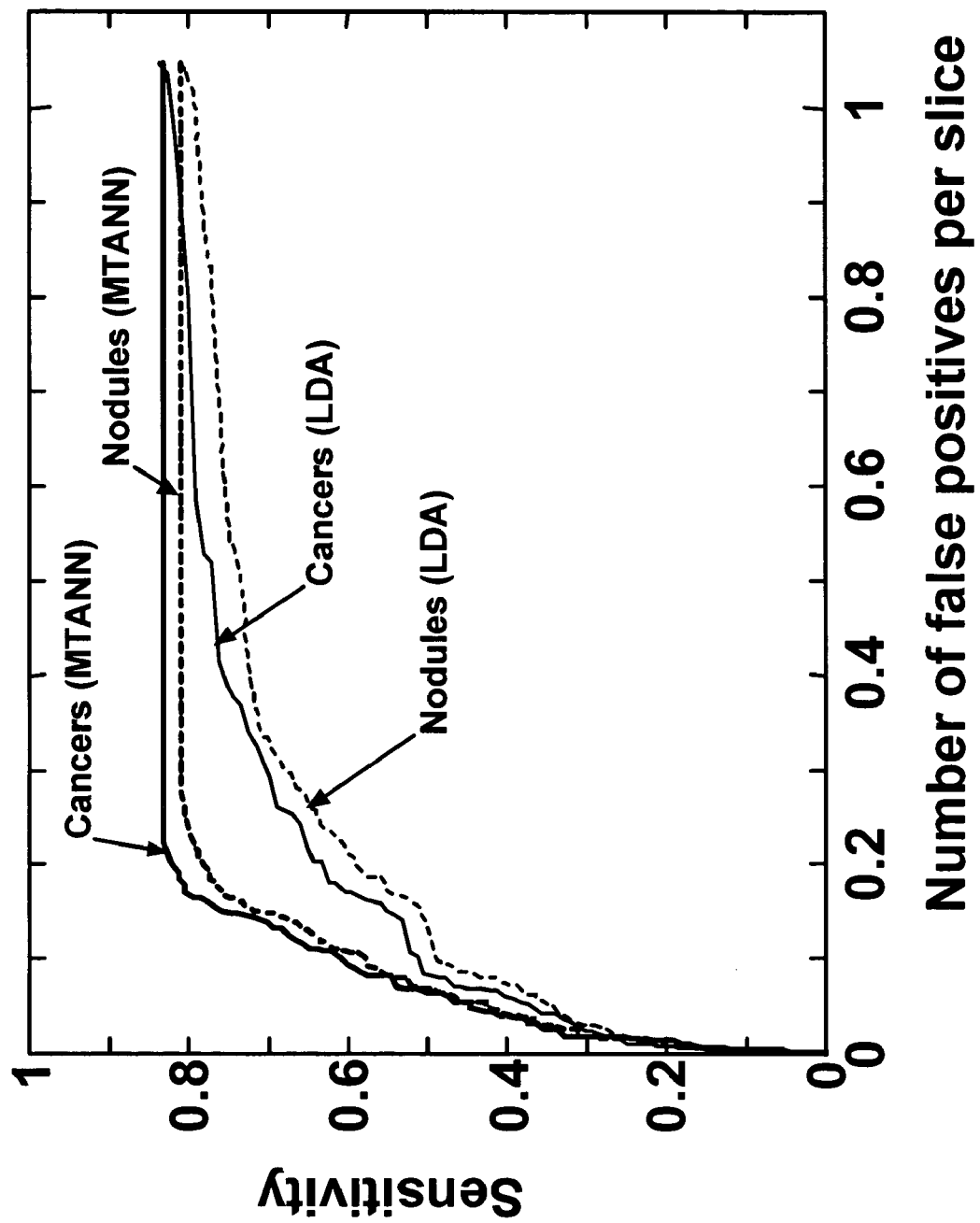
FIG. 8 shows FROC curves of the present method for two databases (all cancers and all nodules) by use of a Multi-MTANN or LDA.

FIG. 8 shows the FROC curves for the overall performance of the present method by use of the Multi-MTANN and the LDA. The sensitivity of LDA gradually decreased with a decrease in the number of false positives, whereas the sensitivity with Multi-MTANN remained constant until the number of false positives per slice was reduced to 0.22 for all cancers or 0.28 for all nodules. The present method using Multi-MTANN or LDA provided a sensitivity of 81% or 67% for all nodules, respectively, with 0.28 false positives per slice. Therefore, Multi-MTANN would be more appropriate for false positive removal than LDA. Finally, 73% (19.7/27.0) of the remaining false positives per scan were removed by using the Multi-MTANN. As a result, the method of the present invention achieved a sensitivity of 83% (91/109) for all cancers with 5.8 false positives per scan, and 81% (106/131) for all nodules with 7.3 false positives per scan. The 84% (32/38) of missed cancers and 83% (59/71) of detected cancers were detected correctly with 5.9 and 5.8 false positives per scan, respectively. Furthermore, it may be important to note that the present method detected 17 (74%) of 23 missed cancers, which were not mentioned in radiologists' clinical reports.

Figure 9:
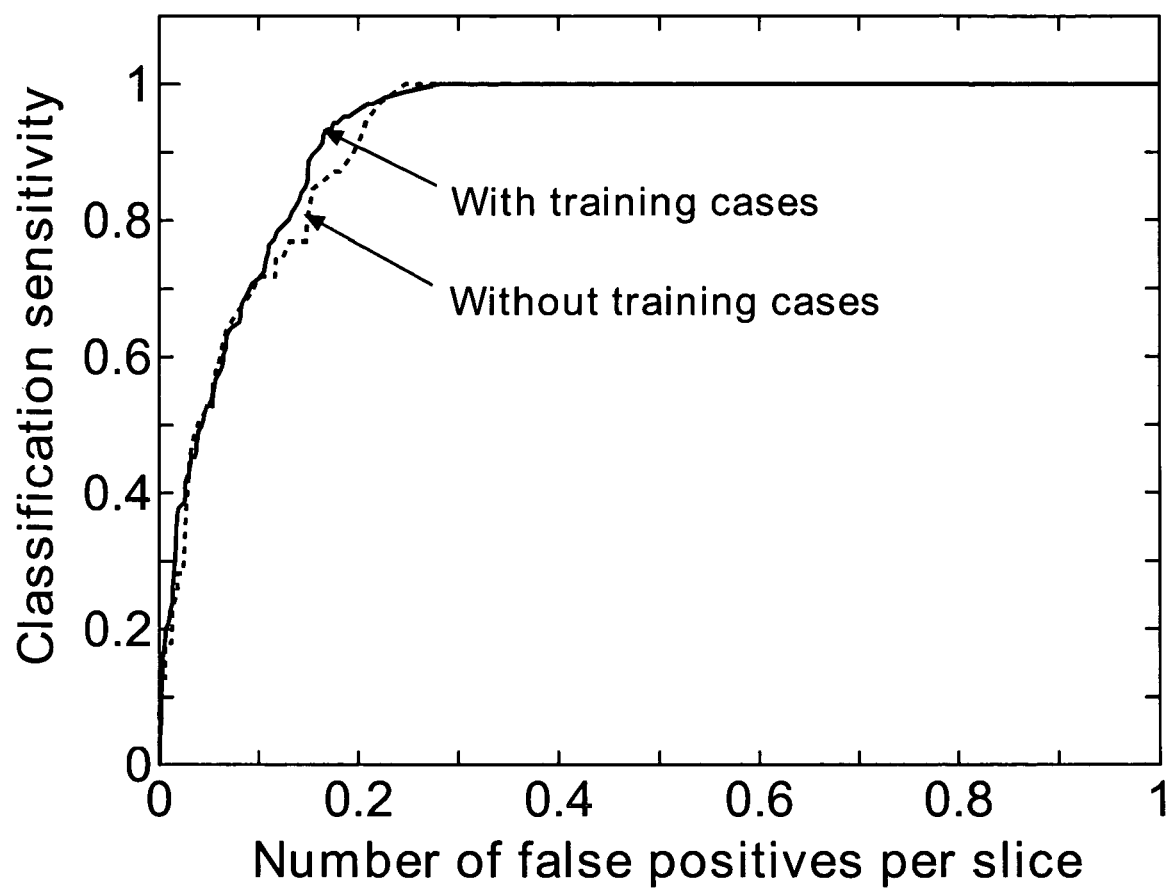
FIG. 9 shows a comparison of FROC curves of the present method with the Multi-MTANN obtained by use of a database with and without training cases.

The performance of Multi-MTANN was superior to that of LDA, probably because Multi-MTANN can learn various image features related to morphology and gray level directly from the images of typical nodules and false positives, and works as an image-based ANN filter with nodule enhancement and false positive suppression to distinguish between nodules and false positives. Furthermore, the Multi-MTANN is a robust classifier for unknown cases. FIG. 9 shows the comparison of FROC curves for the method of the present invention with the Multi-MTANN obtained by use of the database with and without training cases. The FROC curve for the database without the training cases was similar to that for all cases, where the sensitivities at 0.28 false positives on the two FROC curves were almost the same. However, the use of Multi-MTANN requires expertise for selection of typical nodules and typical false positives and a considerable CPU time for training (29.8 hours for a MTANN on a Pentium IV, 1.7 GHz), although the CPU time for testing was negligibly small. On the other hand, since LDA is based on a limited number of image features related to morphology and gray level, the amount of information used for LDA is less than that for Multi-MTANN; nevertheless, LDA is a simple and easily available classifier for most researchers compared with Multi-MTANN.

Based on the two-dimensional (2D) image features alone, the present method achieved a sensitivity of 83% for 109 cancers with 5.8 false positives per scan, which appears to be superior to results obtained in recent studies [11-13] in terms of the number of false positives, wherein some false positives, such as lung vessels, were removed by use of three-dimensional (3D) image features. Therefore, by incorporating 3D image features into the present method, the number of false positives should be reduced even further.

Some of the nodules were not detected by the present method for two reasons. First, some of the large and high-contrast nodules adjacent to the pleura were excluded during the initial segmentation process of the lungs. Because radiologists can easily detect such nodules without a CAD scheme, the present method was not concerned with the exclusion problem of juxta-pleural nodules. It should be noted that all nodules with small size or low contrast were included in the segmented lungs obtained by use of the present method. Another reason is that some of the small and low-contrast nodules adjacent to or overlapped with the pleura or large vessels were not enhanced appreciably by use of the difference-image technique. For detecting such nodules, improved filters used for enhancement of such nodules will be required.

Although the automated detection method of the present invention has been presented in the context of processing LDCT lung images, the method can be implemented using other pulmonary images, e.g., MR or ultrasonic lung images, in which a computerized image analysis is performed with respect to cancer or some other disease state. For example, using sonographic lung images, ultrasound lesion characteristics such as lesion margin sharpness can be used as feature values in the method of the present invention. Moreover, the calculation of ultrasonic lesion characteristics is known in this art. See U.S. Pat. No. 5,984,870 (Giger et al., Method and system for the automated analysis of lesions in ultrasound images), the contents of which are incorporated herein by reference.

The present method can also be implemented more generally on other medical images of other organs (e.g., mammographic breast images, or CT scans of the thorax, abdomen, or skeletal system) with respect to some other disease state or state of risk. Nodule or lesion feature values can readily be obtained from other medical images by those of ordinary skill in the art. For example, characteristics associated with detected colonic polyps can be used as quantitative measures of malignancy calculated in methods of detecting cancerous polyps using colonographic images. The detection of such colonic polyps is discussed in co-pending U.S. patent application Ser. No. 10/270,674 (Yoshida et al., Method for the computer-aided detection of three-dimensional lesions), the contents of which are incorporated herein by reference. Moreover, the detection of nodule or lesion feature values in various medical images is also well known in this art. See, e.g., U.S. Pat. No. 5,881,124 (Giger et al., Automated method and system for the detection of lesions in medical computed tomographic scans), the contents of which are incorporated herein by reference.

For the purposes of this description an image is defined to be a representation of a physical scene, in which the image has been generated by some imaging technology: examples of imaging technology could include television or CCD cameras or X-ray, sonar, or ultrasound imaging devices. The initial medium on which an image is recorded could be an electronic solid-state device, a photographic film, or some other device such as a photostimulable phosphor. That recorded image could then be converted into digital form by a combination of electronic (as in the case of a CCD signal) or mechanical/optical means (as in the case of digitizing a photographic film or digitizing the data from a photostimulable phosphor). The number of dimensions that an image could have could be one (e.g. acoustic signals), two (e.g. X-ray radiological images), or more (e.g. nuclear magnetic resonance images).

This invention conveniently may be implemented using a conventional general-purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

Figure 10:
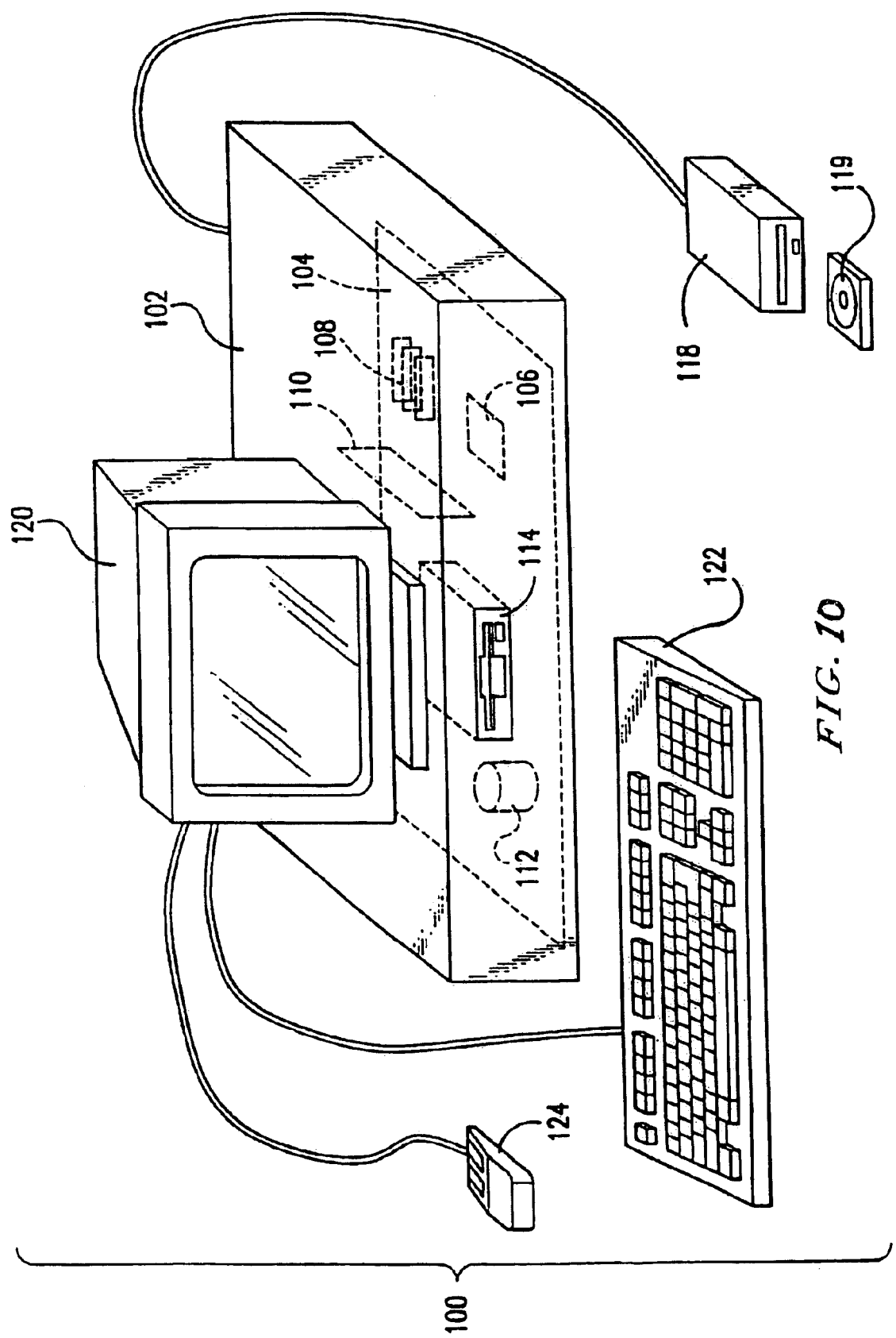
FIG. 10 illustrates an exemplary general purpose computer programmed according to the teachings of the present invention.

FIG. 10 is a schematic illustration of a computer system for the computerized detection of lung nodules according to the present invention. A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives which do not require caddies.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for performing the inventive method of the present invention. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost. For example, an outline or image may be selected on a first computer and sent to a second computer for remote diagnosis.

Moreover, parts of the processing of the present invention may be distributed for better performance, reliability, and/or cost. For example, an outline or image may be selected on a first computer and sent to a second computer for remote diagnosis.

The invention may also be implemented by the preparation of application specific integrated circuits or by interconnecting an appropriate network of conventional component circuits, as will be readily apparent to those skilled in the art.

The invention is embodied, in part, in trained artificial neural networks, in arrangements for training such artificial neural networks, and in systems including both the network portion and the training portions. Of course, the invention provides methods of training and methods of execution. Moreover, the invention provides computer program products storing program instructions for execution on a computer system, which when executed by the computer system, cause the computer system to perform the methods described herein.

Numerous modifications and variations of the present invention are possible in light of the above teachings. It is therefore to be understood that within the scope of the appended claims, the invention may be practiced otherwise than as specifically described herein.

TABLE 1

Sensitivity and number of false positives at various steps for 131 nodules.

|  | Sensitivity | FPs per slice | FPs per scan |
|---|---|---|---|
| Initial pick-up | 93% | 13.1 | 343 |
| First rule-based scheme | 85% | 0.9 | 103 |
| Second rule-based scheme | 81% | 1.0 | 27 |
| Multi-MTANN | 81% | 0.28 | 7.3 |
| LDA | 67% | 0.28 | 7.3 |

The invention claimed is:

1. A method for detecting at least one nodule in a medical image of a subject, comprising:

identifying, in said medical image, an anatomical region corresponding to at least a portion of an organ of interest;

filtering said medical image to obtain a difference image;

detecting, in said difference image, a first plurality of nodule candidates within said anatomical region;

calculating respective nodule feature values of said first plurality of nodule candidates based on image pixel values of at least one of said medical image and said difference image;

removing false positive nodule candidates from said first plurality of nodule candidates based on said respective nodule feature values to obtain a second plurality of nodule candidates; and determining said at least one nodule by classifying each of said second plurality of nodule candidates as a nodule or a non-nodule based on at least one of said image pixel values and said respective nodule feature values, wherein said detecting step includes determining a respective center pixel having a maximum pixel value within a respective nodule region of each nodule candidate in the first plurality of nodule candidates;

calculating, for a first respective subregion that includes said respective center pixel within each respective nodule region, at least one first morphological image feature, said first respective subregion defined as those pixels having a pixel value above a first pixel threshold, but less than said maximum pixel value;

calculating, for a second respective subregion that includes said respective center pixel within each respective nodule region, at least one second morphological image feature, said second respective subregion defined as those pixels having a pixel value above a second pixel threshold, but less than said maximum pixel value; and determining said respective nodule region of each nodule candidate based on respective differences between the at least one first morphological image feature and the at least one second morphological image feature.

2. The method of claim 1, wherein the identifying step comprises:

forming a histogram of gray values of pixels in said medical image;

determining a gray-level threshold using said histogram; and identifying an outline of said anatomical region using said gray-level threshold.

3. The method of claim 1, wherein the identifying step comprises:

identifying, in a low-dose computed tomographic (LDCT) image, a lung region of said subject.

4. The method of claim 1, wherein the filtering step comprises:
   filtering said medical image using a first filter to obtain a nodule-enhanced image;
   filtering said medical image using a second filter to obtain a nodule-suppressed image; and
   subtracting said nodule-suppressed image from said nodule-enhanced image to obtain said difference image.

5. The method of claim 1, wherein the detecting step comprises:
   forming initial regions within said anatomical region; and
   selecting said first plurality of nodule candidates based on said initial regions, each nodule candidate in said first plurality of nodule candidates having said respective nodule region including one of said initial regions.

6. The method of claim 5, wherein the forming step comprises:
   forming a histogram of gray values of pixels in said difference image; and
   determining said initial regions using multiple-gray-level thresholding of said histogram.

7. The method of claim 5, wherein the selecting step comprises:
   calculating respective effective diameter and circularity values for each of said initial regions; and
   selecting said first plurality of candidate nodules based on said respective effective diameter and circularity values of each of said initial regions.

8. The method of claim 1, wherein the calculating step comprises:
   determining, for each candidate nodule in said first plurality of candidate nodules, at least one respective morphological feature value, including at least one of effective diameter, circularity, and irregularity; and
   determining, for each candidate nodule in said first plurality of candidate nodules, at least one respective gray level feature value, including at least one of a first nodule contrast in said difference image, a second nodule contrast in said medical image, a third nodule contrast of a nodule outer region, and a standard deviation of said nodule outer region.

9. The method of claim 8, wherein the removing step comprises:
   removing false positive nodule candidates from said first plurality of nodule candidates based on said at least one respective morphological feature value and said at least one respective gray level feature value.

10. The method of claim 1, wherein the calculating step comprises:
    determining, for each candidate nodule in said first plurality of candidate nodules, at least one respective interior feature value, including one of an average pixel value, full width at half maximum (FWHM), and full width at tenth maximum (FWTM), based on pixel values in an interior region of each candidate nodule; and
    determining, for each candidate nodule in said first plurality of candidate nodules, at least one respective exterior feature value, including one of an average pixel value, full width at half maximum (FWHM), and full width at tenth maximum (FWTM), based on pixel values in an exterior region of each candidate nodule.

11. The method of claim 10, wherein the removing step comprises:
    removing false positive nodule candidates from said first plurality of nodule candidates based on said at least one respective interior feature value, said at least one respective exterior feature value, and respective locations of the nodule candidates within said anatomical region.

12. The method of claim 1, wherein the determining step comprises:
    determining said at least one nodule from said second plurality of nodule candidates based on said image pixel values using a Multi-MTANN (Massive Training Artificial Neural Network).

13. The method of claim 12, wherein the determining step comprises:
    training a plurality of MTANNs to distinguish nodules from a respective type of non-nodules; and
    classifying, based on said image pixel values, said second plurality of nodule candidates using said plurality of trained MTANNs to obtain said at least one nodule.

14. The method of claim 1, wherein the determining step comprises:
    determining, based on said respective nodule feature values, said at least one nodule from said second plurality of nodule candidates using a linear discriminant analysis.

15. A computer program product embedded on a computer-readable medium, the computer program product including program instructions for execution on a computer system, which, when executed by the computer system, cause the computer system to perform the method recited in any one of claims 1-14.

16. A system configured to detect said at least one nodule in said medical image of said subject by performing the steps recited in any one of claims 1-14.

* * * * *